April 21, 1931.  C. E. CHALMERS  1,801,799
CHANGE MAKING MACHINE
Original Filed Oct. 5, 1926   12 Sheets-Sheet 1

INVENTOR
Charles E. Chalmers
BY
ATTORNEYS

April 21, 1931.  C. E. CHALMERS  1,801,799
CHANGE MAKING MACHINE
Original Filed Oct. 5, 1926  12 Sheets-Sheet 2

INVENTOR
Charles E. Chalmers
BY
Bohlebert & Ledbetter
ATTORNEYS

April 21, 1931.  C. E. CHALMERS  1,801,799
CHANGE MAKING MACHINE
Original Filed Oct. 5, 1926   12 Sheets-Sheet 5

INVENTOR
Charles E. Chalmers
BY
Bohleber & Ledbetter
ATTORNEYS

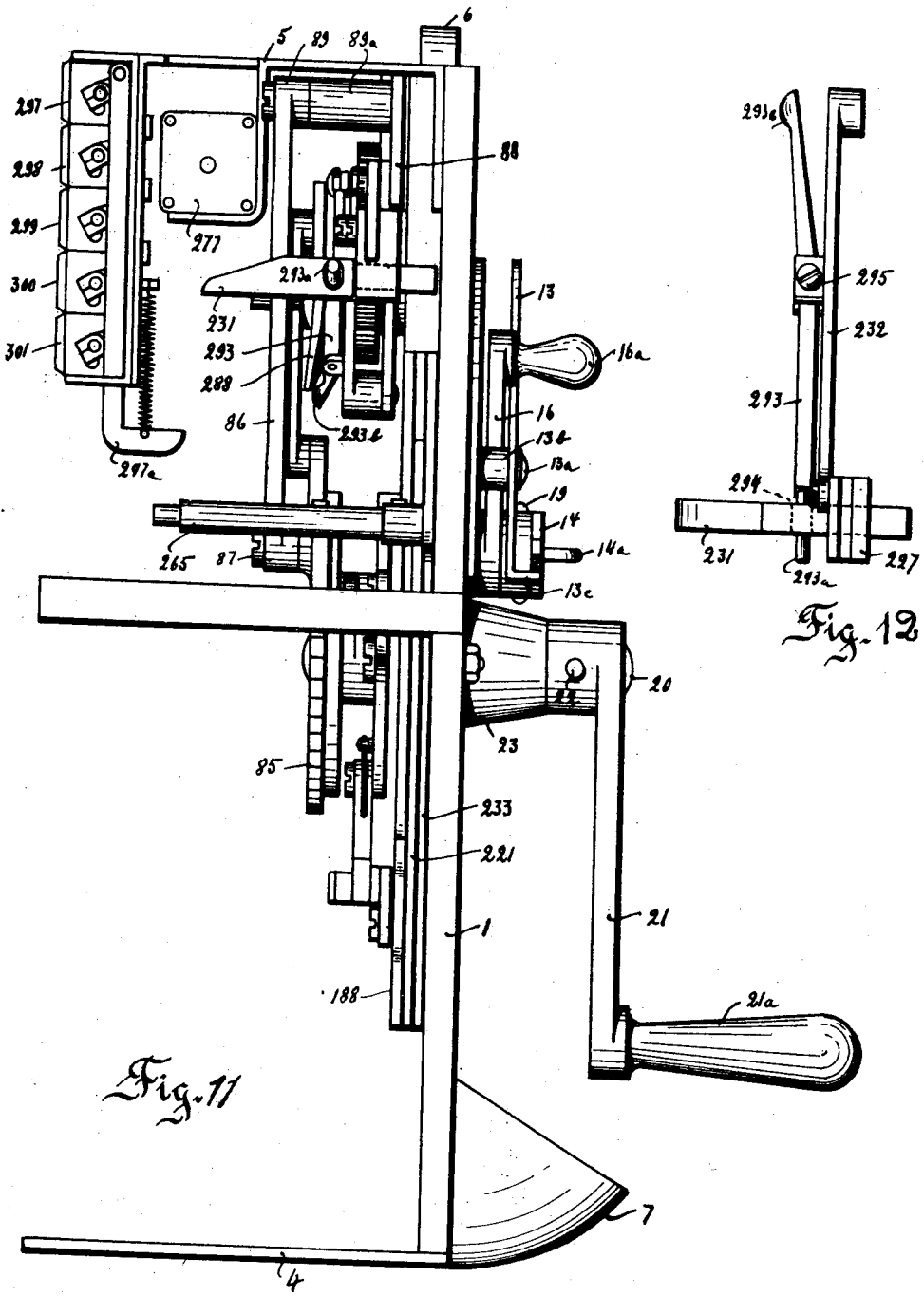

April 21, 1931.    C. E. CHALMERS    1,801,799
CHANGE MAKING MACHINE
Original Filed Oct. 5, 1926    12 Sheets-Sheet 9
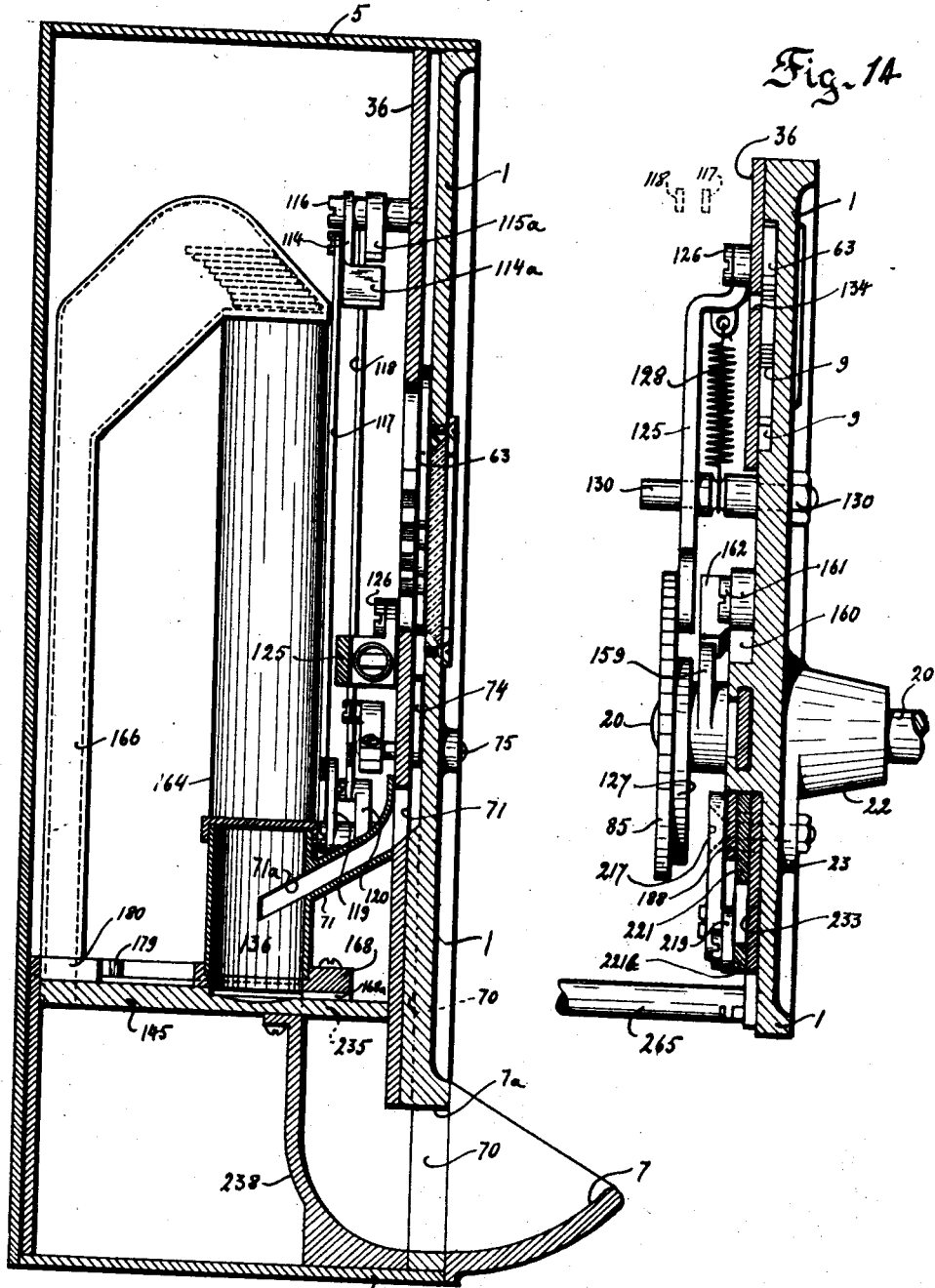
INVENTOR
Charles E. Chalmers.
BY
Bohleber & Ledbetter
ATTORNEYS April 21, 1931.  C. E. CHALMERS  1,801,799
CHANGE MAKING MACHINE
Original Filed Oct. 5, 1926   12 Sheets-Sheet 10

INVENTOR
Charles E. Chalmers
BY
Bohleber & Ledbetter
ATTORNEYS

April 21, 1931.  C. E. CHALMERS  1,801,799
CHANGE MAKING MACHINE
Original Filed Oct. 5, 1926  12 Sheets-Sheet 12
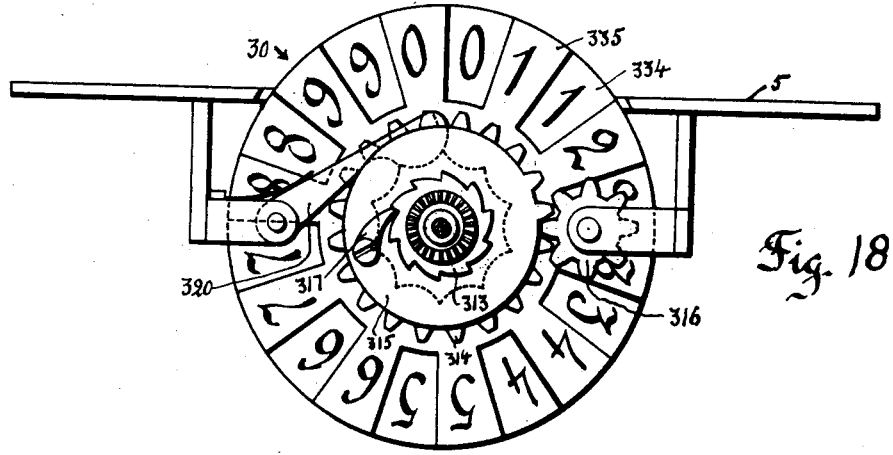
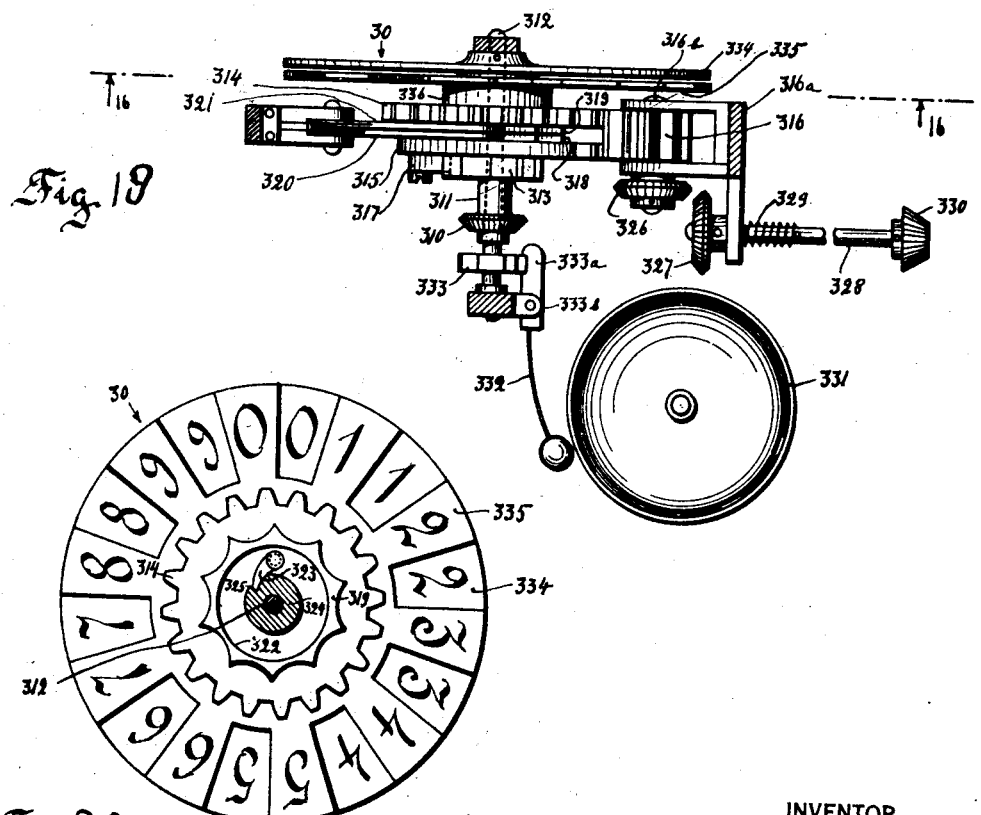
INVENTOR
Charles E. Chalmers
BY
Bohleber & Ledbetter
ATTORNEYS Patented Apr. 21, 1931

1,801,799

UNITED STATES PATENT OFFICE

CHARLES E. CHALMERS, OF NEW YORK, N. Y.

CHANGE-MAKING MACHINE

Application filed October 5, 1926, Serial No. 139,586. Renewed December 31, 1930.

This invention relates to apparatus or a machine adapted for use in collecting money and making change in places where admission is charged, as for example, street cars and the like, and in stores where commodities are sold, and contemplates a machine which will eliminate or minimize the "human factor" and the possibility of mistake and dishonesty on the part of persons charged with collecting such money, and is particularly well adapted for use where the collector has other duties to perform, such as on so-called "one-man cars" where the motorman is required to collect fares, make change and act as conductor.

It is an object of this invention to provide a machine which will be entirely automatic in its operation, and which will be capable of operation by anyone, to receive coins, to collect and register the desired amount and return the necessary change in case the amount to be collected is less than the amount of the coin deposited.

It is a further object of this invention to provide a machine of the class described which cannot be fraudulently operated to cause return of a greater amount in change than the amount deposited, and which will be positive and reliable in operation at all times.

It is a further object of this invention to provide a machine, which when slightly modified, is capable of use as a mechanical change maker, and which will return the full amount deposited, but in other coins.

Finally, and in general, it is an object of this invention to provide a compact, reliable, and inexpensive machine which may be used in the collection of money and making of change and particularly in case where relatively large numbers of relatively small coins must be handled, and which will eliminate or minimize the loss due to mistake or dishonesty on the part either of the payer of the coin or the collector thereof.

The features of novelty which I believe to be characteristic of my invention are pointed out with particularity in the appended claims. My invention itself however, both as to its fundamental principles and as to its practical embodiments will best be understood by reference to the specification and accompanying drawing, in which Fig. 1 is a front elevation of a machine according to my invention;

Fig. 11 is a left side elevation of the machine with the left side cover removed;

Fig. 12 is a detail operatively associated with the coin rejector mechanism;

Fig. 13 is a vertical section taken on the line 13—13 of Fig. 4;

Fig. 14 is a horizontal section taken on the line 14—14 of Fig. 3;

Fig. 18 is an elevation of the trip register mechanism, partly broken away;

Fig. 19 is a plan view thereof, partly in section;

Fig. 20 is a sectional elevation thereof on lines 16—16 of Fig. 15.

Figure 1:
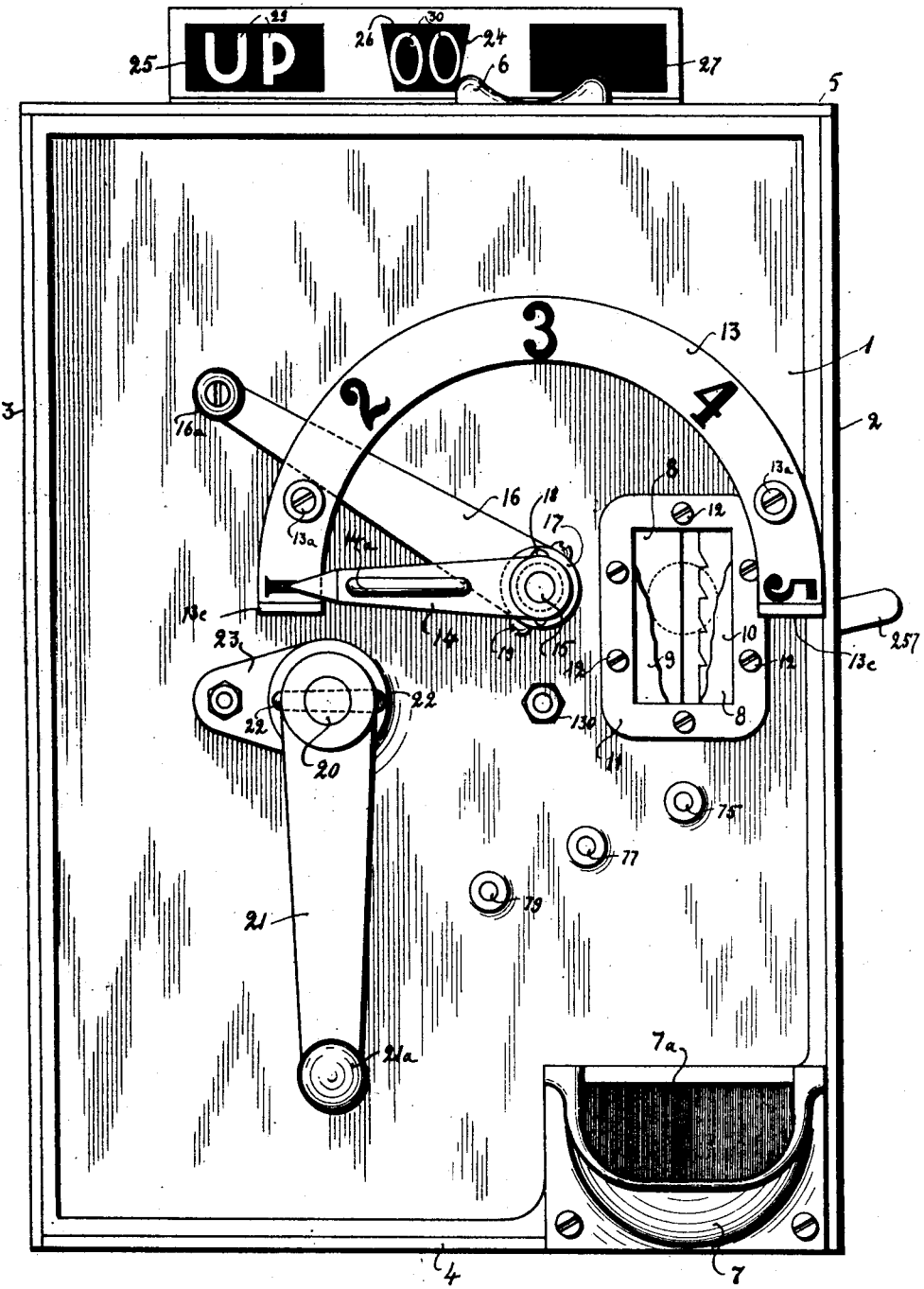

By way of example I have shown such a machine particularly adapted for use on street cars and which receives coins deposited by passengers in payment of fare, collects fares, makes and delivers change, and performs various other operations with a minimum of attention from the operator. According to my invention the machine is constructed and arranged to receive all coins in common use such for example as pennies, nickels, dimes, quarters and half-dollars, and is furthermore provided with selector mechanism by which the operator may indicate the number of fares to be collected or amount to be paid and with an operating control by which he may then operate or clear the machine by a simple means, such as a crank, and the machine will collect the coin deposited by the passenger, record the number or amount of fares paid and return or deliver to the passenger the proper amount of change in accordance with the denomination of coin deposited and the amount to be collected. For example, if the price of admission is 5¢ and the passenger upon entering has a nickel, he will deposit the same in the coin receptor slot. The operator may then operate or clear the machine by rotating the crank and the machine will collect and register the nickel deposited by the passenger. If however, the passenger deposits a dime instead of a nickel, upon operation or clearing of the machine by the crank just as before, the dime will be collected, one fare registered, and a nickel will be returned to the passenger without any action by the operator except that of turning the crank. Similarly if the passenger deposits a quarter in payment of one fare, upon operation of the machine the quarter will be collected, one fare registered and four nickels returned or delivered to the passenger. Similarly if the passenger deposits a half dollar, upon operation of the machine it will collect the coin, register one fare and return to the passenger the proper change consisting of a quarter and four nickels and all without requiring any adjustment or control by the operator, except to turn the crank. If, however, the passenger desires to pay more than one fare the machine may be set to collect the number desired. For example, if the passenger deposits a dime in payment of two fares, the machine may be set to collect two fares, and upon operation of the machine, the dime will be collected, two fares registered and no change returned. If the passenger deposits a quarter in payment of two fares operation of the machine will collect the quarter, record two fares and return three nickels to the passenger. Similarly if a passenger deposits a half dollar the machine will collect the same, record two fares and return the proper change consisting of a quarter and three nickels. Similar action takes place for the payment of three fares and four fares when the passenger deposits a quarter or a half dollar. If the passenger deposits a half dollar for the payment of five fares operation of the machine will collect the coin deposited and return the proper change consisting of one quarter. It is to be noted that in all cases the change consists of nickels and quarters. Pennies and dimes are not delivered by the machine as change for reasons which will be understood later.

If through mistake or dishonesty a passenger deposits a coin insufficient for the payment of the fare, or deposits a counterfeit or slug, the machine may be operated to return the coin or slug deposited to the passenger and will not record the collection of a fare. It will however record a rejected coin for purposes to be explained later.

The machine is preferably so arranged that only one coin at a time may be deposited under any conditions as otherwise, in the embodiment of the invention illustrated and described, this might interfere with the proper operation of the machine and cause the incorrect amount of change to be delivered as will be more clearly explained later.

For convenience of description and understanding of my invention the mechanism will be subdivided and explained with reference to the various sub-divisions and to the co-operation of the various sub-divisions with one another. In general my invention contemplates (1) coin-receptor mechanism; (2) coin classifying apparatus; (3) coin distributing mechanism; (4) change delivery mechanism; (5) multiple fare mechanism; (6) collection counting mechanism; and (7) rejection mechanism.

The coin receptor mechanism comprises a slot of suitable dimensions to receive any coin deposited by the passenger and convey it to the coin classifier, comprising apparatus adapted to receive the coin deposited and to classify it according to size and value. Each of the different coins finally comes to rest in a different position in the classifier, for example, dimes in one place, pennies in another, nickels in another and so on. Both of these mechanisms (1) and (2) are operated simply and solely by the insertion of a coin by the passenger; in other words no operation by the operator or conductor is required to cause the machine to receive a coin and classify it, whereas all other mechanisms are operated by the one operating or clearing control. The coin distributor (3) distributes the various coins in accordance with a predetermined plan; for instance, nickels are deposited in a nickel receptacle, and quarters in a quarter receptacle, while dimes, half dollars and pennies are delivered to a third receptacle adapted to receive all three. The change delivery mechanism (4) delivers to passengers the proper amount of change in nickels or nickels and quarters depending upon the denomination of the coins deposited and the number of fares to be paid. In case a passenger desires to pay more than one fare the operator will bring into operation the multiple fare mechanism (5) which controls the change delivery mechanism to deliver the proper change in accordance with the coin deposited and the number of fares to be paid. In all cases of fare collection the collection counter mechanism (6) will be operated to record the number of fares collected per trip and the total number of fares which have passed through the machine since beginning operation.

Finally, rejection mechanism (7) is provided operable by the conductor to return to the passenger the coin deposited when desired. The rejection mechanism cooperates with the change delivery mechanism (4) and the collection counting mechanism to prevent the delivery of change and the indication of a collection of fare. Separate rejection counters are provided however, which record the number of rejections made by the machine. In addition, various interlocking devices are provided between the groups of mechanism already referred to, which serve to prevent the operation of certain groups of mechanism under certain conditions as will be later explained.

External features

Referring to Fig. 1, 1 designates the front panel or wall of the machine and 2, 3, 4 and 5 the side, bottom and top walls respectively. 6 is the coin receptor having a slot 35 (see Fig. 2) in which the passenger deposits his coin in payment of a fare or fares, and 7 is the change delivery cup or receptacle into which the machine delivers the change or rejected coins through the perforation 7a in the front wall of the machine. 8 designates an inspection window through which the conductor or collector may observe the coin deposited by the passenger in operative position on the machine, and 9 and 10 respectively are the jaws of the coin classifier or gauge which will later be described in more detail. 11 designates a suitable frame for the window 8, and 12, screws for removably securing the frame 11 to the front plate 1, to permit easy removal of the glass, for any desired purpose.

There is also provided a fare dial provided with figures indicating the number of fares to be collected and this is preferably in the form of a curved metal strip 13 secured to the front wall 1 of the machine and spaced therefrom by suitable screws 13a and tubular spacing members 13b (see also Fig. 11). A fare selector 14 is provided for movement to select and indicate the number of fares which the machine is set to collect and for convenience of operating it the fare selector may be provided with a suitable projecting fingerpiece or handle 14a. The fare selector is mounted for rotation upon fare selector shaft 15 and held in position thereon by a suitable pin 18 passing through the hub of the fare selector 14 and shaft 15 respectively. The metal strip or dial 13 is preferably provided with members 13c to limit the movement in either direction of the selector 14.

To permit the operator to cause the machine to reject coins when desired there is provided a rejector arm 16 the outer end of which is provided with an operating knob 16a. The rejector arm 16 is secured to a shaft 17 which is in the from of a sleeve encircling the fare selector shaft 15. The rejector arm 16 is secured to the rejector shaft 17 by one or more suitable set screws 19.

A main operating or clearing shaft is provided, such as shaft 20, equipped with an operating arm 21 carrying a suitable knob or handle 21a. Operating arm 21 is secured to the main operating shaft 20 in any suitable way, as for example by a pin 22 passing through the arm 21 and shaft 20. For the purpose of strengthening the machine and providing a large bearing surface for the main operating or control shaft 20 there is employed an outwardly extending boss 23 suitably secured to the front plate 1.

For the purpose of indicating the number of fares collected per trip there is provided a trip indicator 24 provided with windows 25, 26, and 27. The windows 25 and 27 are arranged to display a suitable indication of the direction of the trip such as sign 29 while window 26 is arranged to show a suitable fare register 30 (see also Fig. 14) indicating the number of fares collected per trip.

Coin receptor mechanism

Figure 2:
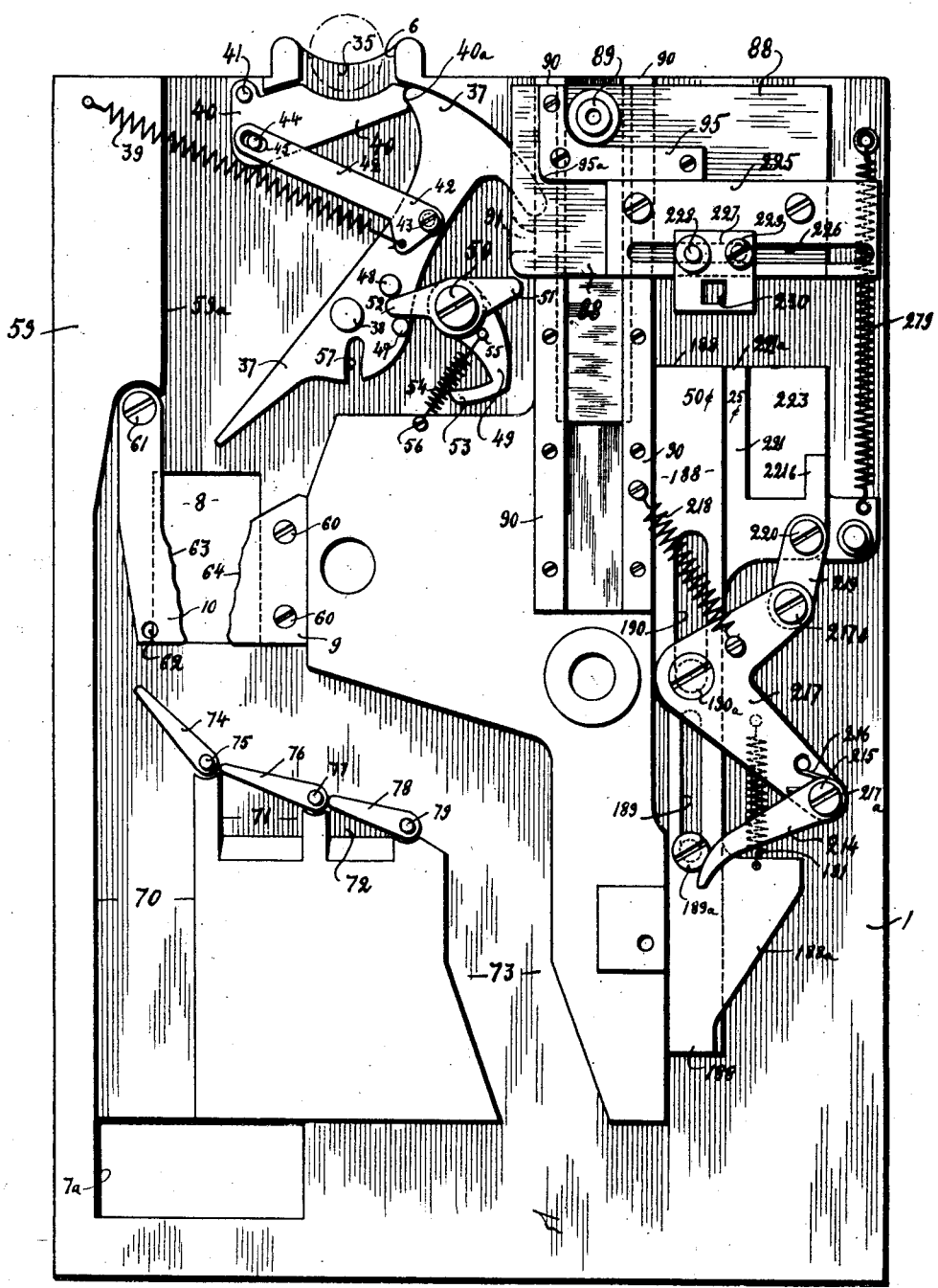
Fig. 2 is a rear elevation, showing the coin receptor and coin classifier mechanism and a portion of the coin distribution mechanism.
Figure 3:
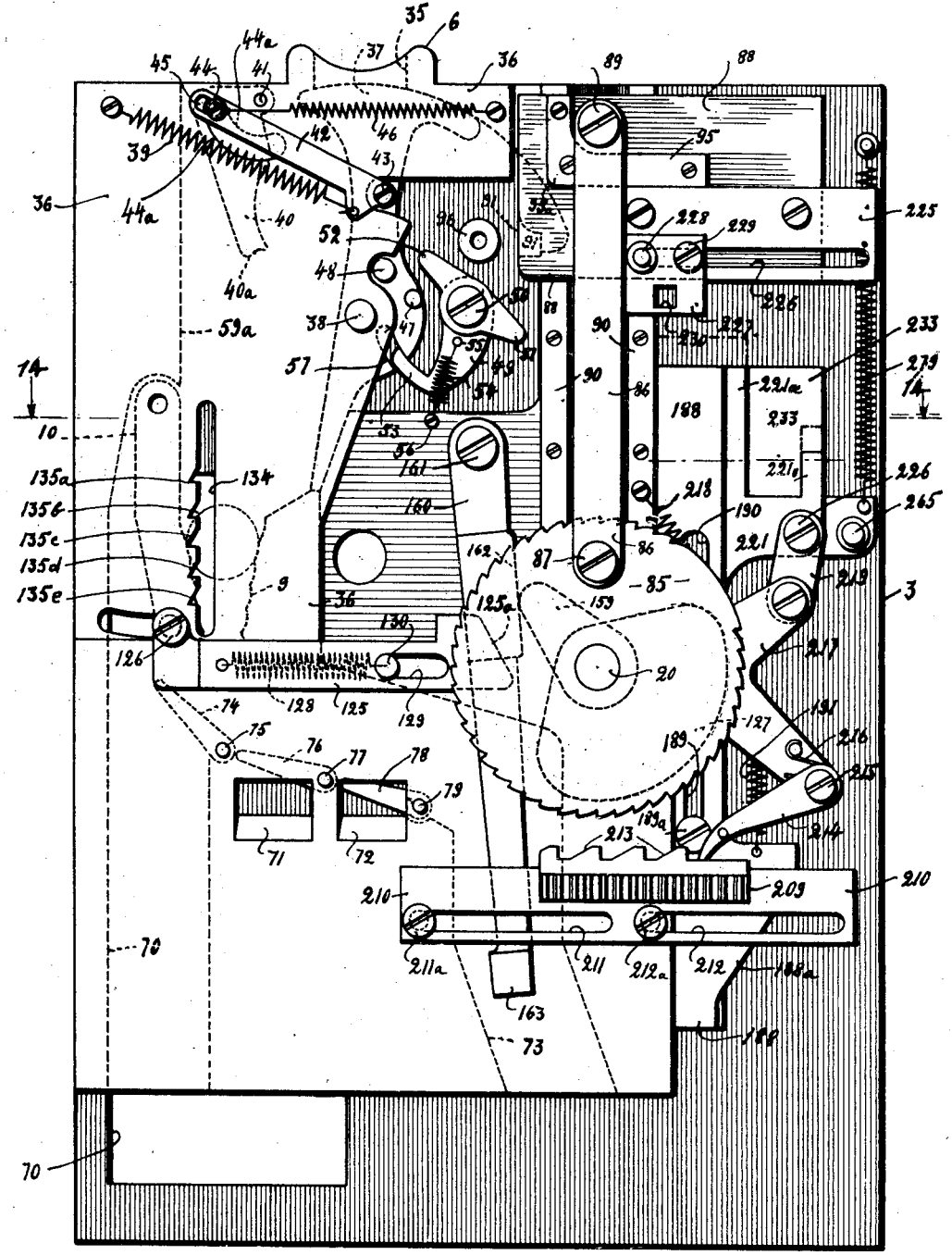
Fig. 3 is a similar view on a plane nearer the rear showing the coin receptor mechanism in different position, and showing additional coin distributing and change delivery mechanism.
Figure 7:
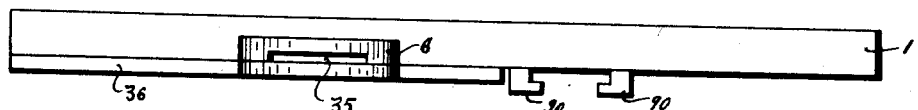
Fig. 7 is a detail plan view of the front plate.
Figure 10:
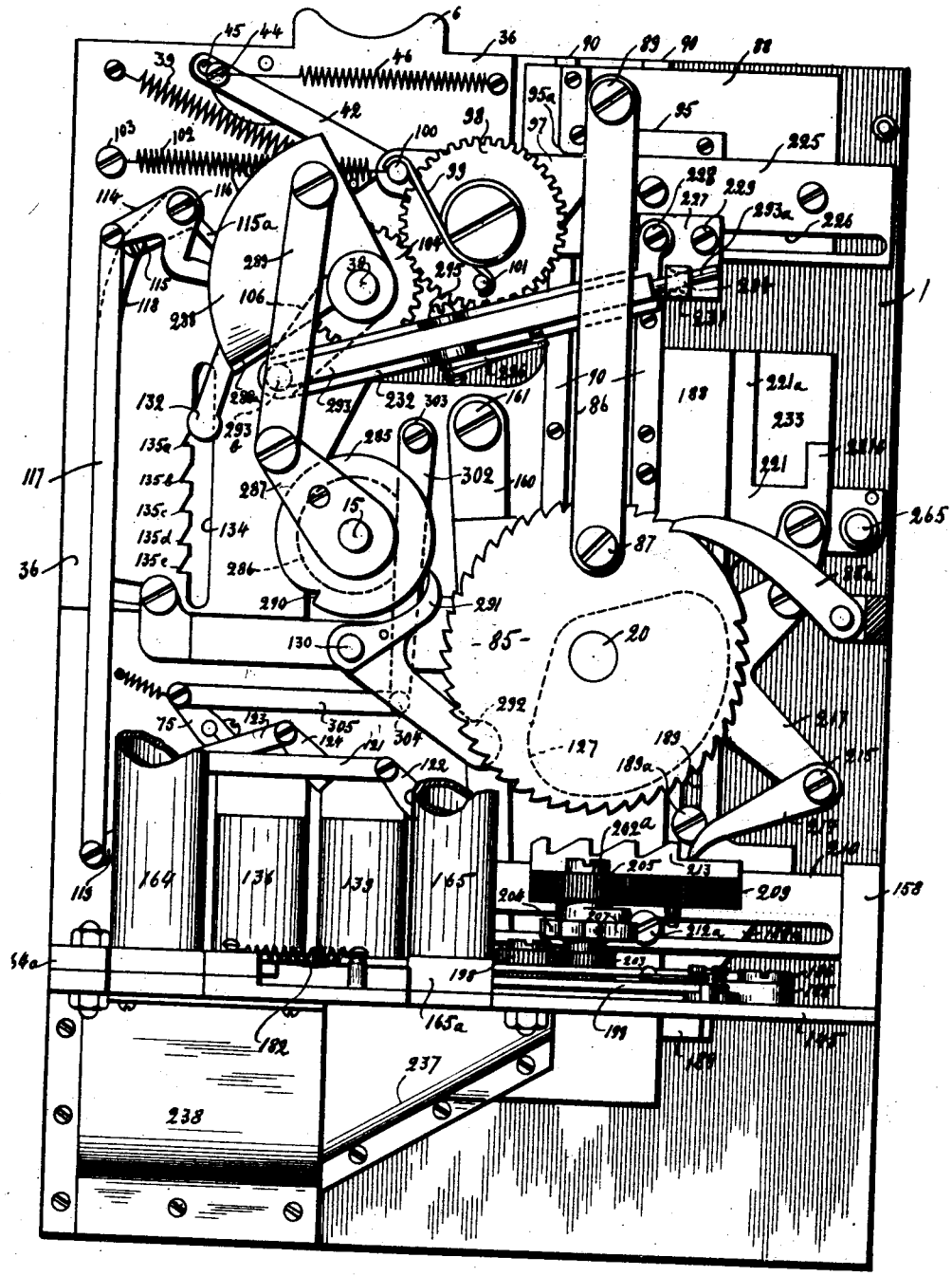
Fig. 10 is a rear view of the interior mechanism of the machine with the rear cover removed, said mechanism being shown in normal position.

Referring now more particularly to Fig. 2 the slot 35 of the coin receptor 6, already referred to, is of just sufficient width and depth to permit the largest coin to be used by the machine to pass readily therein. In this example the slot is just of sufficient size to allow a half dollar to pass readily therein. The back of the slot 35 is formed by backing plate 36 (see Figs. 3 and 7), and a suitable shutter 37 is provided which is adapted, inter alia, to swing across the slot when a coin is deposited to prevent the reception by the machine of more than one coin at a time. The shutter 37 is pivoted on a rod 38 for swinging movement to the position indicated in Fig. 3 to which position it is biased by shutter spring 39. The shutter 37 is normally held in the position shown in Fig. 2 against the tension of spring 39 by a suitable coin trigger 40 pivoted at 41 for swinging movement to the position shown in Fig. 3 and having a notch 40a in its free end. A suitable connecting rod 42 is pivoted at one end as at 43 to shutter 37 and at the other end as at 44 to the coin trigger 40. A lost motion arrangement, such as slot 45 in rod 42, is provided to permit of a slight amount of lost motion between coin trigger 40 and connecting rod 42 the purpose of which will be explained later. A trigger spring 46 is provided anchored at one end to backing plate 36 as shown in Figs. 3 and 10 and having its other end attached to connecting rod trigger pivot 44 travelling in the slot 44a of plate 36. The shutter 37 is provided with a pair of rearwardly extending pins, a lower pin 47 and an upper pin 48, and a coin deposit interlocking lever 49 is provided pivoted at 50 for swinging movement and having a pair of outwardly projecting arms 51 and 52 and a locking hook 53. An operating spring 54 is provided for coin deposit interlocking lever 49 connected at one end to pin 55 on lever 49 and at the other end to pin 56 forming a fixed point. The shutter 37 is provided with a locking slot 57 arranged to receive locking hook 53 on interlocking lever 49.

Figure 4:
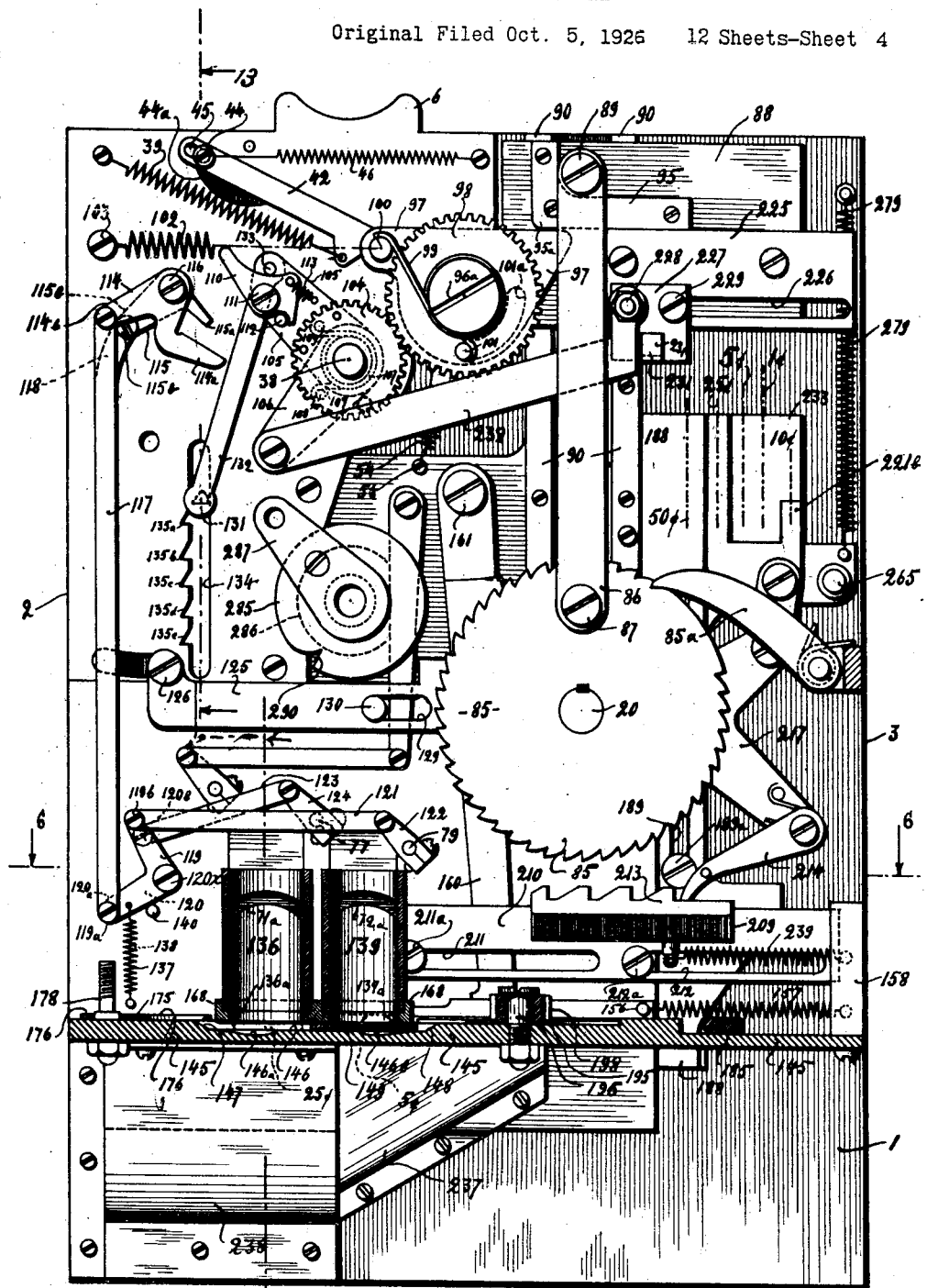
Fig. 4 is a similar view, taken on line 4—4 of Fig. 6, on a plane still nearer the rear and showing additional coin distribution and change delivery mechanism but with the nickel and quarter magazines removed.

Referring now more particularly to Figs. 3 and 4 the main operating shaft 20 is provided with a ratchet disc 85 engaged by pawl 85a (see Fig. 4) to permit counter-clockwise rotation only of shaft 20, to which disc is connected a connecting rod 86 pivoted eccentrically on disc 85 as at 87. A slider or sliding block 88 is also provided and the upper end of connecting rod 86 is pivoted thereto as at 89 on slider connecting rod pivot boss 89a (Fig. 11). The slider block 88 slides upward and downward in parallel slider guides 90 (see also Fig. 7) and is provided at its lower left hand corner with a notch 91. Operation of the main operating arm 21, as will be understood, causes rotation of shaft 20 carrying with it ratchet disc 85 and thereby causes slider 88 to move downward and upward in slider guides 90 in much the same way as the piston and connecting rod of a steam engine sliding in the cross head guides as will be readily understood.

It should be noted that shutter spring 39 is at least twice as strong as trigger spring 46, and also that the interlocking arm 49 is shown in Fig. 3 in its free position in which the tension of the interlocking spring 54 causes arm 49 to take a position in which pivot 50, spring 54 and pins 55 and 56 all lie in the same straight line, thereby permitting arm 49 to rock either clockwise or counter-clockwise from said position.

*Operation of coin receptor mechanism*

Assuming that the parts are in the position shown in Fig. 2 the machine is ready to receive a coin to be deposited by the passenger. The shutter 37 is held in the position shown by coin trigger 40 which extends across slot 35 and blocks for the time being the deposit of a coin. The notch 40a in the end of coin trigger 40 engages the end of shutter 37 so that a condition of equilibrium is obtained in which spring 39 is stretched and spring 46 is contracted. Arm 52 of locking arm 49 projects between pins 47 and 48 and arm 51 of lever 49 extends laterally into the path of downward movement of slide 88. It will be noted that under these conditions the main operating arm 21 cannot be rotated because downward movement of block 88 causes the latter to impinge against arm 51 of lever 49, and lever 49 is held against rotation by reason of arm 52 extending between pins 47 and 48 while shutter 37 is held against movement by coin trigger 40 as already explained. It will therefore be seen that unless a coin is deposited and the trigger released the machine cannot be operated.

When a coin is deposited downward pressure on the coin displaces the notch 40a and releases the coin trigger 40 which holds the shutter 37 against the tension of spring 39. As the trigger 40 is pushed down slightly and released pin 44 moves in slot 45 against the tension of spring 46, and shutter 37 is left free to swing. Spring 39 draws the shutter 37 rapidly to the position shown in Fig. 3 and, in conjunction with the connecting rod 42, rotates coin trigger 40 against the tension of the relatively weak spring 46 to the position shown in Fig. 3. The connecting rod 42, pins 43 and 44 and curve of left side of shutter 37 are so constructed and arranged that the distance between shutter 37 and trigger 40 permit only one of the largest coins at a time to pass on down into the machine. Also, it will be noted that rotation of shutter 37 frees arm 52 of lever 49 for rotation under the action of spring 54 which draws arm 49 to the position indicated in Fig. 3, in which interlocking hook 53 enters slot 57, but only partially while arm 51 of lever 49 continues to project into the path of downward movement of slider 88.

After the deposit of a coin it will be apparent that shutter 37 extends across the coin slot blocking the opening and preventing the deposit of an additional coin and cannot now be pushed back to open the slot because of the position of locking hook 53 in slot 57. It is also noted that the movement of shutter 37, by virtue of the shape of the upper end thereof, has impelled the coin downwardly through the slot 35 to the coin classifier jaws 9 and 10 where it may be observed through the inspection window 8. If the operator desires to collect the coin he may do so by operating the control arm 21 by rotating it once in a clockwise direction. Passing over the action of the collection mechanism, which will be explained later, this resets the coin receptor mechanism in the following manner. Sliding block 88 moves downwardly under the action of connecting rod 86 and since lever 49 is now free to rotate by a slight amount, the lower left hand end of slider block 88 displaces, from its path of movement, arm 51, rotating lever 49 in a clockwise direction causing hook 53 to pass further into slot 57. When the slider 88 has reached its downwardly extremity of travel it begins to return upward. It will be understood that arm 51 has been pressed against the side wall of slider 88 by the action of spring 54 and as notch 91 in slider 88 passes arm 51 the latter is forced therein by said spring 54 and lever 49 rotated in a counter-clockwise direction partially withdrawing locking hook 53 from slot 57. Further upward movement of slider 88 causes further counter-clockwise rotation of lever 49 which causes arm 52 to impinge on pin 47 thereby rotating shutter 37 in a clockwise direction to the position shown in Fig. 2 against the tension of spring 39, while connecting rod 42 swings coin trigger 40 approximately to the position shown in Fig. 2. The trigger 40 is drawn into final position by the tension of spring 46 and by reason of lost motion slot 45 a slight amount of play is provided which permits the parts to reach equilibrium with the notch 40a in engagement with the lower left hand side of shutter 37. The coin receptor mechanism has now been returned to the position from which it started and a complete cycle has been made.

Coin classifier

The coin deposited by the passenger passes through slot 35 between the edge of the coin trigger 40 and the shutter 37, said trigger and shutter defining a passage-way which is of sufficient width to permit only one largest coin at a time to pass therethrough. The coin passes downwardly coming to rest between the fixed classifier jaw 9 and the movable classifier jaw 10. The coin is prevented from travelling sideways by reason of spacer plate 59 having a vertical edge 59a against which the edge of the coin is adapted to impinge and which serves to separate backing plate 36 from front plate 1 and thereby provide space for the shutter and coin trigger already described. The space is of a thickness, from front to back, somewhat in excess of the thickest coin used, that is a half dollar. The fixed classifier jaw 9 is secured to the front plate 1 by suitable means such as screws 60 and movable jaw is secured to front plate 1 by a suitable pivot 61 and is provided with a hole 62 the purpose of which will be described later. Both the fixed jaw 9 and movable jaw 10 are provided with a series of curved edges 63 and 64 adapted to receive and separate the various coins at different positions; for example, a dime is supported at the lowest point, a penny at the next higher point, a nickel at the next higher, a quarter at the next higher, and a half dollar at the top. The series of curves are provided for the purpose of supporting the coins at approximately the same point regardless of whether the coin is worn or unworn.

Operation of coin classifier

The operation of the coin classifier is very simple and as already pointed out requires no operation of the mechanism of the machine. The coin deposited by the passenger, after being dropped, passes between the jaws 9 and 10 of the classifier and takes a position depending upon its size and remains in such position until released by an outward swinging movement of the movable jaw 10 and its pivot 61. The swinging movement of the jaw results from the operation of other mechanism which will be described later.

Coin distributor mechanism—gate control

A slot or passageway 71 is provided which I term a quarter passage and which receives only quarters. An additional passage 72 is also provided which receives only nickels. Finally a passage 73 is provided adapted to receive and convey pennies, dimes and half dollars to a suitable receptacle. The passageway 70 serves to convey rejected coins to the change return cup 7. A series of gates are provided in the form of swinging arms which normally close or obstruct the rejector, quarter and nickel passages but which may be selectively swung out of the way to open any one of these passages as desired. Gate 74 is mounted for partial rotation on the shaft 75 and controls the rejector passage 70. Gate 76 mounted on shaft 77 controls the quarter passage 71 and similarly gate 78 mounted on shaft 79 controls the nickel passage 72. It is clear that no gate is necessary to control passage 73 since if gates 74, 76 and 78 are all closed coins drop by gravity into and through passage 73, and on the other hand if any one of these gates are open the coin is not permitted to pass into passage 73, because in opening any one of passages 70, 71 or 72, its gate swings into position where it obstructs passage 73.

Referring now to Fig. 3, the main operating shaft 20 is provided with ratchet disc 85 as already described, connected through connecting rod 86 to slider 88. The slider 88 carries a projection 95 in the form of an angle arm secured thereto (see also Fig. 4). This arm is provided with a rounded corner 95a. The front plate 1 of the machine carries a stud 96 upon which is mounted for rotation a cam 97 (Fig. 4) secured by suitable means such as screws 96a. Also upon the same stud and likewise mounted for rotation is a gear 98 connected to cam 97 by means of spring 99 which encircles stud 96, having one end secured to pin 100 on cam 97 and the other end secured to a pin 101 on gear 98. A lost motion connection between the cam and gear is thus provided such that rotation of cam 97 in a clockwise direction drives the gear 98 through spring 99 whereas rotation of the cam 97 in counter-clockwise direction drives gear 98 through a rigid connection formed by pin 101 and circular slot 101a. A master return spring 102 (see also Fig. 10) of sufficient strength to return all parts of the mechanism to normal position is provided having one end attached to pin 100 on cam 97 and having the other end attached to a suitable fixed point 103. A suitable gear 104 is mounted for rotation on shaft 38 and arranged to mesh with gear 98. A lever arm 105 is provided likewise mounted on rod 38 and connected rigidily to gear 104. a second lever arm 106 is also mounted on shaft 38 for rotation but is connected through spring 107 to gear 104 in such a way that arm 106 is resiliently driven from gear 104, but having also lost motion. The rotation of gear 104 in a clockwise direction drives the arm 106 through a rigid connection and rotation of gear 104 in a counter-clockwise direction drives the arm 106 through spring 107. Spring 107 encircles shaft 38 and is preferably connected at one end to pin 108 mounted on arm 106 and at the other end to pin 109 mounted on arm 105 which is rigidly connected to gear 104. A lever arm 110 is pivoted at 111 on arm 105 the latter being provided with a stop or limit pin 112 which prevents rotation of lever arm 110 from its normal position about pivot 111 in a clockwise direction. For the purpose of enabling a limited rotation of arm 110 about pivot 111 in a counter-clockwise direction spring 113 is provided connected at one end to a suitable point on arm 110 and at the other end to a suitable point on lever 105.

Bell crank levers 114 and 115 are provided preferably mounted upon a common pivot 116 the former of which is provided with angularly extending arms 114a and 114b and the latter with angularly extending arms 115a and 115b. Arm 114b is pivotally connected to connecting rod 117 and arm 115b is similarly pivotally connected to connecting rod 118. At its lower end the connecting rod 117 is pivotally connected to arm 119a of bell crank lever 119. The opposite end 119b of bell crank lever 119 is connected through connecting rod 121 to lever arm 122 mounted on shaft 79 to which is secured the nickel gate 78. In a similar manner the lower end of connecting rod 118 is connected to arm 120a of bell crank lever 120 the other arm 120b of which is connected to connecting rod 123, the other end of which is connected to arm 124 mounted on shaft 77 carrying the quarter gate 76. Suitable springs 137 and 138 are provided to hold bell crank levers 119 and 120 in their normal positions against a fixed stop pin 140. The bell crank levers 119 and 120 are mounted on a suitable pivot 120x.

As will be seen in Fig. 3 a push rod 125 having a cam face 125a is connected to hole 62 in the movable classifier jaw 10 by means of a suitable pivot 126, said push rod 125 being operable by means of cam 127 secured to the main shaft 20. The push rod 125 is normally maintained at its right hand extremity of movement by means of spring 128 having one end suitably connected to the push rod 125 and its other end connected to a guide pin 130 mounted on the plate member 1 projecting through a slot 129 in the push rod 125.

Referring now more particularly to Fig. 4, there is provided a feeler finger 131 mounted on feeler finger push rod 132 which is pivoted to the lever arm 105 at 133. Feeler finger 131 projects through feeler finger slot 134 which is off center with respect to the position of rest of the coins in the coin classifier, in such manner that as the feeler finger moves downward in a manner to be later described, and impinges upon the edge of a coin in the coin classifier it will be guided to the left as viewed from Fig. 4 and come to rest in one of the notches 135a, 135b, 135c, 135d or 135e depending upon whether the coin is a 50¢ piece, a quarter, a nickel, a penny, or a dime respectively. Finally, a suitable receptacle such as 136 is provided for the quarters delivered through delivery passage 71 to conduit 71a leading to receptacle 136 and similarly, a nickel receptacle 139 is provided for the nickels delivered through passage 72 into a conduit 72a leading to said receptacle 139.

*Operation of coin distributor mechanism— gate control*

It has already been pointed out that the main operating shaft 20 cannot be rotated until a coin has been deposited and has found its way to the coin classifier. Assuming that a coin has been deposited which has taken up its proper position in the coin classifier the next operations are as follows: Main shaft 20 is rotated in a counter-clockwise direction as viewed from Fig. 3, by rotation of the main operating crank 21, which causes downward movement of slider 88 as already described. The elbow 95a, as will be noted from Fig. 4, impinges against cam 97 and rotates the same in a clockwise direction driving gear 98 through spring 99 already described, and thereby driving gear 104 in a counter-clockwise direction. The rotation of gear 104 causes similar rotation of lever arm 105 rigidly connected thereto and feeler finger 131 is pushed downwardly in slot 134 by the action of connecting rod 132. If a half dollar is in the coin classifier it has taken a position such that feeler finger 131 is guided into notch 135a. Further downward movement of the feeler finger 131 is thereby prevented which in turn prevents further rotation of arm 105, gear 104 and gear 98. The cam 97 however is permitted to continue its rotation through the action of the spring 99. Further rotation of the main shaft 20 brings cam 127 against the end of push rod 125 and forces the same to the left swinging the movable classifier jaw 10 to the left about its pivot 61 and thereby enabling the coin to drop through the classifier jaws. Since none of the gates 74, 76 and 78 have been operated the coin which is assumed to be a half dollar finds its way through passageway 73 into a suitable receptacle. When the main shaft 20 has completed a half turn the pivot 87 begins to move upward instead of downward thereby returning slider 88 to initial position. The spring 102 returns cam 97 to initial position as soon as permitted by the return of slider 88 carrying projection 95, and the rigid connection between cam 97 and gear 98 for counter-clockwise movement as already described rotates gear 98 in a counter-clockwise direction driving gear 104 in a clockwise direction returning arm 105 to normal position and moving feeler finger 131 to its initial position or upper extremity of movement.

If the passenger deposits a quarter instead of a half dollar the quarter comes to rest in the coin classifier at such a point that the feeler finger 131 is forced into notch 135b instead of 135a. The arm 105 is rotated in a counter-clockwise direction as before described but in this instance arm 110 is moved a sufficient distance to strike against arm 115a of bell crank lever 115 thereby rotating the same in a clockwise direction, lifting connecting rod 118, operating bell crank lever 120 in a clockwise direction, rotating shaft 77 in a clockwise direction and thereby opening quarter gate 76. Further rotation of the main shaft 20 causes the actuation of push rod 125 as previously described which releases the coin from the classifier jaws and enables the coin to fall into the quarter receptacle 136 through passage 71 and conduit 71a by reason of the position of gate 76. The return of the mechanism to normal or starting position is the same as already described.

If the passenger has deposited a nickel upon the operation of the main shaft 20, the feeler finger 131, is forced into notch 135c. The arm 110 in this instance passes by arm 115a momentarily opening the quarter gate 76 as already described but releasing the same which immediately closes under the action of spring 138. Lever arm 110 next impinges upon lever arm 114a rotating bell crank lever 114 in a clockwise direction, lifting connecting rod 117, rotating bell crank lever 119 in a clockwise direction and by means of connecting rod 121 and lever arm 122 rotates shaft 79 in a clockwise direction and opens the nickel gate 78, whereby release of the coin in the manner already described permits it to drop into the nickel receptacle 139, through passage 72 and conduit 72a. The return of the mechanism is the same as already described except that it is to be noted that lever arm 110 is free to rotate in a counter-clockwise direction upon its pivot 111 in order to pass by the bell crank arm 115a, after which the spring 113 returns it to its initial position.

In case the passenger deposits either a penny or a dime and the conductor collects the same, the arm 105, as it rotates in a counter-clockwise direction, passes arm 115a and 114a in turn thereby opening gates 76 and 78 momentarily in turn. The gates are quickly closed again by springs 137 and 138 after passage of arm 110, so that when the coin is released by operation of push rod 125 the gates are all in closed position as shown in Fig. 2 and the coin drops into passageway 73. The return of the mechanism to initial position is the same as previously described except that in this instance lever arm 110 moves in a counter-clockwise direction on pivot 111 on passing bell crank arm 114a as well as 115a. As will be now understood the feeler finger operates as before described.

It is to be noted in this connection that cam 127 is so disposed upon the main shaft 20 that it does not operate to release the coin from the coin classifier until the proper gates have been opened to direct the coin into the proper receptacle, as determined by the feeler finger 131. Also, the purpose of the resilient drive between cam 97 and gear 98 for clockwise rotation of cam 97 will now be understood. It is clear that cam 97 must rotate far enough to carry feeler finger 131 down to 135c, if necessary, but at the same time feeler finger may stop at notch 135a which would jam the machine, were not some suitable yielding connection provided.

*Coin distributor mechanism—magazine loading mechanism*

It has already been pointed out that pennies, dimes and half-dollars are deposited in a common receptacle through passageway 73 whereas quarters are deposited in a quarter receptacle 136 and nickels in a nickel receptacle 139 through passageways 71 and 72 respectively. The purpose of separating quarters and nickels from other coins as also pointed out previously is to permit the use of quarters and nickels in making change. Since a large number of quarters and nickels must be carried to assure operation of the machine at all times a relatively large magazine must be provided for each of these coins, and apparatus must be provided for conveying the quarters and nickels received by the machine and deposited in the quarter receptacle and the nickel receptacle from these receptacles to the respective magazines, from whence they may be delivered by the machine in making change.

Figure 5:
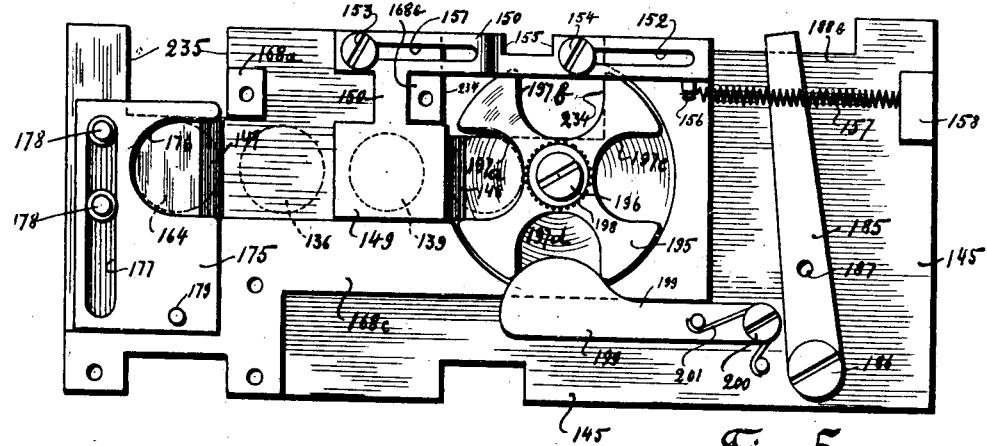
Fig. 5 is a plan view of the horizontal sub-panel showing a portion of the quarter and nickel delivery mechanism.

By referring to Figs. 4, 5, 6, and 10 it will be noted that the machine is provided with a horizontal subpanel 145 which carries the quarter and nickel receptacles 136 and 139 also the quarter magazine 164 and nickel magazine 165 adjacent thereto (see Fig. 10). A suitable spacer block 168 supports receptacles 136 and 139 slightly above sub-panel 145 and openings 136a and 139a are provided in the spacer block 168 of the same size and configuration as the respective receptacles so as to permit under certain conditions a quarter or nickel to drop upon sub-panel 145. A depression 146 is formed in sub-panel 145 extending under both receptacle 136 and receptacle 139 the edges of which depression are bevelled as at 147 and 148 (Figs. 4 and 5). Likewise slightly deeper portions are provided at points 146a and 146b. A relatively thin shuttle 149 which is just slightly thinner than a quarter or nickel is provided and arranged to slide laterally in depression 146. The shuttle 149 is provided with a guide arm 150 (see Fig. 5) provided with slots 151 and 152 in which are respectively mounted shuttle guide pins 153 and 154 secured to sub-panel 145. A cut out portion 155 is provided in the shuttle guide arm 150 between slots 151 and 152 and a shuttle spring 157 is provided having one end attached to pin 156 on shuttle guide arm 150 and the other end attached to a suitable point 158.

The main shaft 20 is provided with a cam 159 (see Fig. 3) and a shuttle actuating lever 160 is pivotally mounted at 161 and provided with an offset portion 162 adapted to be engaged by cam 159. The lower extremity of shuttle actuating lever 160 is formed with a head 163 adapted to engage cut out portion 155 in shuttle guide arm 150 in such manner that swinging movement of lever 160 drives shuttle 149 forward and backward.

Figure 6:
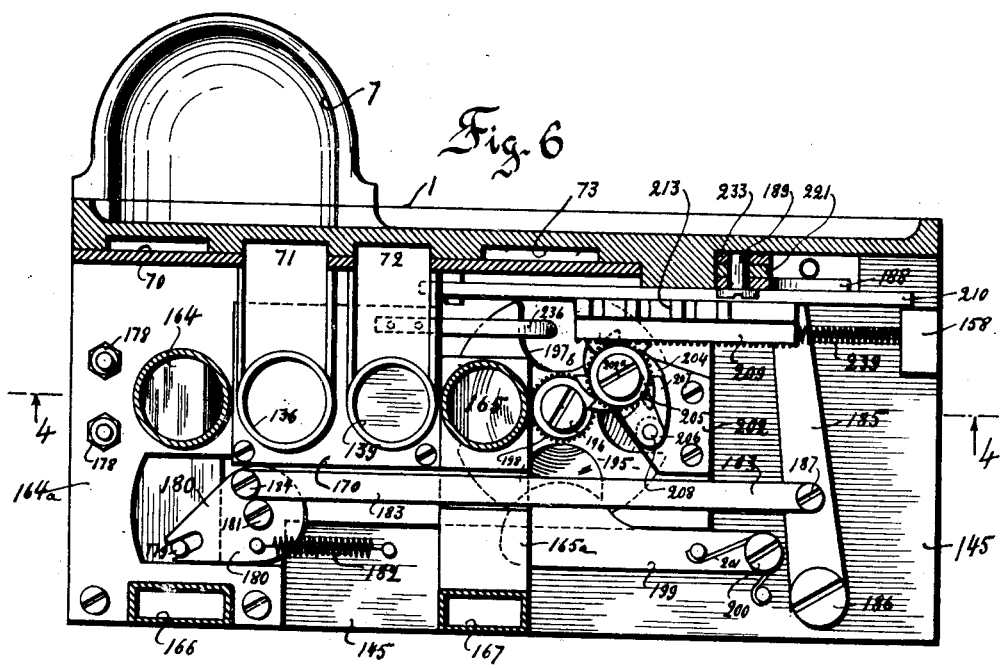
Fig. 6 is a similar sectional view on line 6—6 of Fig. 4 on a higher plane showing the magazines and receptacles in position.

The sub-panel 145 is provided with a spacing plate 164a, Figure 6, for supporting the quarter magazine 164 and a similar spacing plate 165a for supporting the nickel magazine 165. A quarter overflow pipe 166 is suitably arranged to connect with the top of the quarter magazine to enable the overflow of any excess of quarters to the general penny, dime and half-dollar receptacle and a similar nickel overflow pipe 167 is arranged to enable the overflow of the excess of nickels from the nickel magazine to the same receptacles.

Operation of magazine loading mechanism

When a quarter is collected by the machine as previously pointed out it is delivered to the quarter receptacle 136 and takes the position shown in dotted lines in Fig. 4, lying in depression 146 directly upon sub-panel 145. On the other hand a nickel when collected by the machine is delivered to nickel receptacle 139 and lies upon shuttle 149 as also shown in dotted lines in Fig. 4. Rotation of the main operating control 21 forces cam 159 against offset portion 162 of lever 160 as will be seen from Fig. 3. This swings the lever 160 in a clockwise direction and the head 163 thereof carries the shuttle 149 toward the left. The left hand edge of shuttle 149 impinges against the edge of the quarter lying in depression 146 of sub-panel 145 and slides it laterally under the left hand edge of the supporting block 168. Continued movement of the shuttle slides the quarter up over the bevelled edge 147 at a slight angle and laterally in and under the lowest quarter in the quarter magazine 164, thereby raising the level of the top coin in the magazine by the thickness of the quarter just added at the bottom of the pile. The additional depression 146a permits the free movement of the coin out of the quarter receptacle 136 while inclined at an angle by reason of the bevelled edge 147.

While the shuttle 149 is moving to the left as just described the nickel resting thereon is held against movement by the edge of nickel supporting block 168 and as the shuttle reaches its left hand extremity of movement the nickel which formerly rested upon the shuttle is no longer supported thereby and drops upon sub-panel 145 falling into depression 146 where it is engaged by the edge of a shuttle 149 on its return stroke and carried laterally under block 168 and up bevelled edge 148 under the lowest nickel in nickel magazine 165, thereby raising the level of coins thereunder by the thickness of the nickel just added on the bottom of the pile in a manner similar to that described for quarters. It will now be seen that the quarter and the nickel in the receptacles 136 and 139 respectively are removed therefrom and loaded in the respective magazines and it is also to be noted that this removal is practically the first operation of the machine upon rotation of the main shaft 20. Spring 157 returns the shuttle to its initial position before the removable classifier jaw 10 opens to allow a new coin to drop into the proper receptacle so that the receptacles 136 and 139 are always first cleared of the coin therein before an additional coin is delivered thereto which prevents jamming of the machine due to more coins accumulating in these receptacles than there is space for.

Change delivery in mechanism—quarter delivery.

It has been pointed out how the quarters collected by the machine are carried to the quarter magazine 164. It will now be explained how the quarters are delivered from this magazine in case it is necessary to deliver a quarter in making change.

Referring now to Fig. 5 there is provided a quarter delivery slide 175 lying directly upon sub-panel 145 and having an opening 176 formed therein of just sufficient size to accommodate a quarter therein with proper clearance. Quarter delivery slide 175 is preferably a little less in thickness than the thickness of a worn quarter and is provided with a slot 177 in which are mounted guide screws 178 fixed in sub-panel 145. Slide 175 is also provided with a projecting drive pin 179 adapted to be engaged by bifurcated lever arm 180 pivoted at point 181 to the sub-panel 145 and provided with spring 182 for yieldingly maintaining it at its counter clockwise extremity of movement, which maintains slider 175 with its opening 176 registering with the coin space in quarter magazine 164, in such manner that when a quarter is delivered to the magazine as just described, it rests upon sub-panel 145 but is within the cut-out portion 176 of slider 175, ready to be moved laterally on movement of the latter. A connecting rod 183 is provided pivoted to lever arm 180 at point 184 and having its other end pivotally connected at point 187 to the driving lever 185 the latter being pivoted at point 186 on sub-panel 145.

Referring more particularly to Figs. 2 and 10 there is provided a quarter delivery plate 188 provided with a cam surface 188a and having guiding slots 189 and 190 provided respectively with guiding pins 189a and 190a secured to the front panel 1. A suitable return spring 191 is provided for maintaining sliding plate 188 at its upper extremity of movement. Sub-panel 145 is cut out, as indicated at 188b, Figure 5, to permit cam 188a to slide upward and downward in contact with the lever 185 and thereby rock lever 185 in a clockwise direction about its pivot 186.

Operation of quarter delivery mechanism

It will now be seen that downward movement of sliding plate 188, caused by mechanism which will be described later, carries cam 188a downward thereby forcing lever 185 to rotate in a clockwise direction and carrying connecting rod 183 to the right as shown in Fig. 6. This rotates lever arm 180 clockwise and by means of pin 179 carries slider 175 toward the front of the machine thereby removing the quarter from the bottom of the pile in quarter magazine 164 and carrying it forward over cut out 235 (see Fig. 5) where it immediately drops downward into a passage or chute 238 leading to the change return cup. Spring 182 returns arm 180, connecting rod 183, and lever 185 to initial position as plate 188 is being returned to initial position by spring 190, thereby returning slider 175 to initial position, whereupon the lowermost quarter in the magazine 164 drops into cut out 176 and rests upon sub-panel 145 and the mechanism is now ready to deliver another quarter.

Change delivery mechanism—nickel delivery

Figure 8:
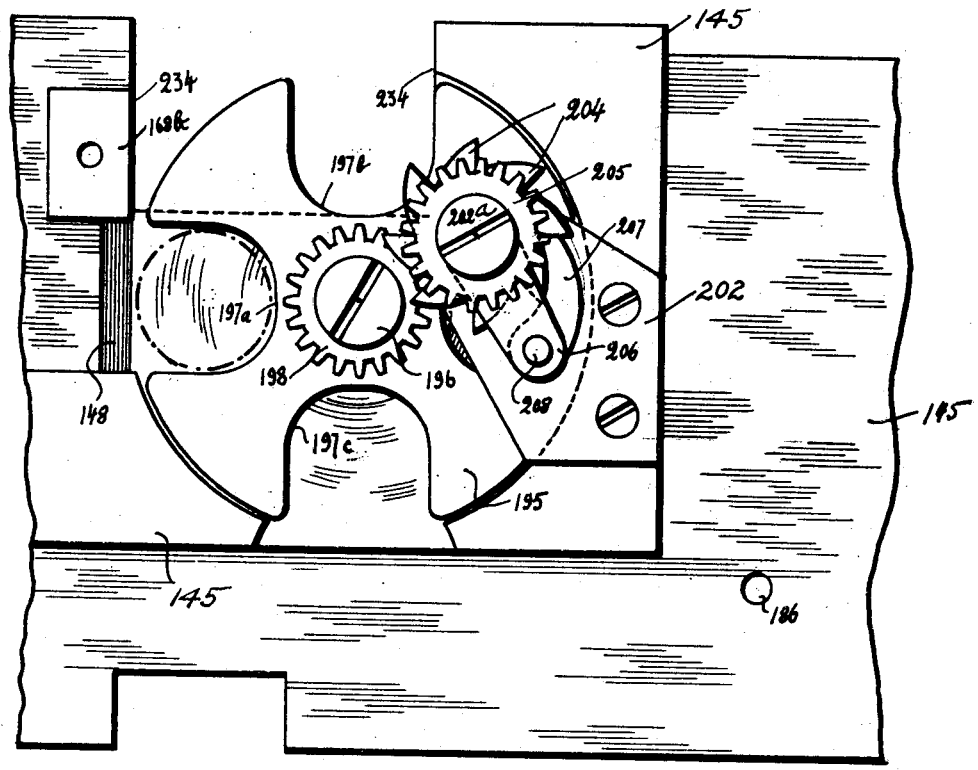
Fig. 8 is an enlarged plan view of certain change delivery mechanism.
Figure 9:
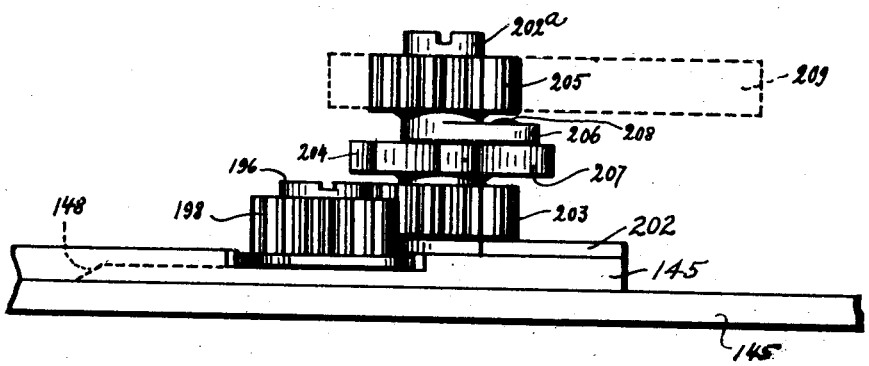
Fig. 9 is a rear view of the mechanism shown in Fig. 8.

Referring to Fig. 5 there is provided a cut out disc or turnstile 195 pivoted at point 196 on a suitable pivot, as for example a stud bolt mounted upon sub-panel 145. The turnstile 195 is formed with four cut-outs 197a, 197b, 197c, and 197d of just the proper size to receive a nickel and is preferably slightly less in thickness than a worn nickel. A gear 198 is rigidly secured upon turnstile 195 and a suitable centering pawl 199 is provided pivoted as at 200 and provided with a suitable spring 201 for biasing it against turnstile 195 in such manner as to line the turnstile openings 197a, 197b, 197c or 197d accurately in position of registry with the lower end of the nickel magazine 165 so that the path of the inlet for nickels up bevelled edge 148 onto sub-panel 145 is not obstructed. A suitable supporting plate 202 is provided extending parallel to sub-panel 145 and in spaced relation thereto, (Fig. 8), so as to permit turnstile 195 to rotate, and plate 202 is provided with a stud bolt 202a forming a shaft for a suitable gear 203 arranged to mesh with gear 198. Rigidly secured to gear 203 is a ratchet wheel 204 and freely mounted upon shaft 202a is an additional gear 205 having an arm 206 rigidly secured thereto and carrying spring pressed pawl 107 adapted to cooperate with ratchet wheel 204. A drive rack 209 is provided meshing with gear 205 and rack 209 is rigidly secured to sliding block 210 provided with slots 211 and 212 and guide screws 211a and 212a, (see Figs. 3 and 4). A second and driven rack 213 is secured to the top of slider 210 adapted to be engaged by slider drive pawl 214 pivotally mounted at 215 upon bellcrank lever 217 pivoted upon guide pin 190a (see Fig. 2). A suitable spring 216 is provided for maintaining pawl 214 at its downward extremity of movement. The bell crank lever 217 is provided with a lower arm 217a and an upper arm 217b and a suitable spring 218 is provided for maintaining bell crank lever 217 at its counter clockwise extremity of movement. A relatively short connecting link 219 is pivoted at one end to arm 217b of bell crank lever 217 and at its other end to point 220 of sliding block 221 having a long end 221a and a short end 221b.

Referring now to Fig. 3, there is provided a guiding plate 225 rigidly secured to sliding block 88 and provided with a slot 226. A suitable smaller block 227 is provided with pins 228 and 229 the former of which is adapted to act as a combined driving pin and a guide pin and the latter of which is to act as a guide pin projecting into slot 226. Pin 228 also projects into slot 226. Block 227 is provided with a rectangular opening 230 in which may be slidably mounted a master change control finger 231 (see Figs. 10 and 11). A connecting rod 232 is pivoted at one end to driving pin 228 on slider 227 and having an elbow formed therein in such manner that the center line of the connecting rod 232 intersects the center line of the master change control finger 231 (see Figs. 4 and 10). The other end of connecting rod 232 is pivoted to arm 106. A suitable slide 233 is provided for operating counting mechanism which will be explained later. Sub-panel 145 is provided with a cut-out 235 through which quarters may be delivered and a cut-out 234 through which nickels may be delivered (see Fig. 5), and a suitable ejector spring 236 is mounted on the sub-panel 145 to assure the ejection of nickels from turnstile 195 when the nickels pass over opening 234. Suitable nickel and quarter delivery chutes 237 and 238 (see Figs. 4 and 10) are provided for delivering the coins passing through the cut-outs 234 and 235 to the change return cup 7 and a return spring 239 is provided for maintaining rack 209 at its right hand extremity of movement.

*Operation of change delivery mechanism*

Referring now to Fig. 4 it will be seen that as feeler finger 131 moves downwardly, carried by push rod 132, connecting rod 232 is pushed to the right by the rotation of arm 106 thereby sliding block 227 carrying master change control finger 231 to the right, but since slider 88 is also moving down the master change control finger 231 is carried down and makes contact with the plates 188, 221a or 221b and 233 at the points indicated by the dot and dash lines in Fig. 4 marked 50¢, 25¢, 5¢, 1¢ and 10¢ respectively and in this connection it should be noted that the top edges of these plates as well as the top edge of plate 221b are preferably roughened and finger 231 may likewise be roughened, or otherwise suitably constructed so that when contact is made finger 231 cannot slide further to the right. Slight yielding of arm 106 is provided for by reason of the resilient connection between arm 106 and gear 104 which permits arm 106 to rotate slightly as slider 88 moves down and thereby changes the angular position of connecting rod 232 after finger 231 has engaged with plates 188, 221 or 233. It will be noted that if a dime is in the classifier, feeler finger 131 travels to notch 135e and finger 231 will take a position at the extreme right in Fig. 4 and on its downward movement will contact first with sliding block 233 operating mechanism which will be later explained. It finally engages with arm 221b rotating bell crank lever 217 clockwise forcing rack 213 to the left carrying rack 209 to the left (see Fig. 6) rotating gear 205 counter clockwise and by means of pawl 207 rotating ratchet wheel 204 counter clockwise driving gear 203 and finally thereby driving gear 198 and rotating turnstile 195 clockwise through 90° whereby the lowermost nickel in nickel magazine 165 is carried by cut-out 197a in turnstile 195 in a clockwise direction 90° over delivery cut-out 234 and ejected by ejector spring 236, falling into nickel delivery chute 237 and into the change return cup 7.

In case the passenger has deposited a penny, feeler finger 131 travels to notch 135d and finger 231 takes the next position in order to the left as indicated by the dot and dash line for pennies. The downward movement of the finger in this position actuates no change return mechanism and similarly if the passenger deposits a nickel downward movement of the finger 231 in the nickel position actuates no change return mechanism. If the passenger has deposited a quarter the finger 231 contacts with arm 221a driving plate 221 downward to the full extent of its movement which is four times the movement already described when the passenger deposits a dime thereby rotating turnstile 195 through 360° and carrying the four lowermost nickels from nickel magazine 165 successively over delivery cut-out 234 where they are ejected by spring 236. If the passenger deposits a half-dollar the finger 231 moves into the position shown at the extreme left in Fig. 4 and actuates plate 221 as just described to return four nickels but also actuates the plate 188 of the quarter delivery mechanism as previously described thereby returning to the passenger one quarter and four nickels. It is to be noted in this connection that the turnstile is never rotated in a counter-clockwise direction. Return of the slider 221 to normal position under the action of spring 218 permits spring 239 to return rack 209 to its initial position rotating gear 205 in a clockwise direction thereby carrying arm 206 in a clockwise direction without rotating ratchet wheel 204 as will be readily understood.

In all of the above it will be observed that there is returned to the passenger from coins of higher denominations an amount of change corresponding to the payment of one fare.

*Multiple fare mechanism*

It has already been pointed out that a fare selector is provided by means of which the conductor may cause the machine to operate to collect more than one fare from the coins of higher denominations deposited therein. In this particular instance provision is made for the collection of as many as five fares if desired but it will be understood that this is by way of example only and the machine may readily be arranged to collect as many fares as desired up to the value of the largest coin deposited.

Figure 15:
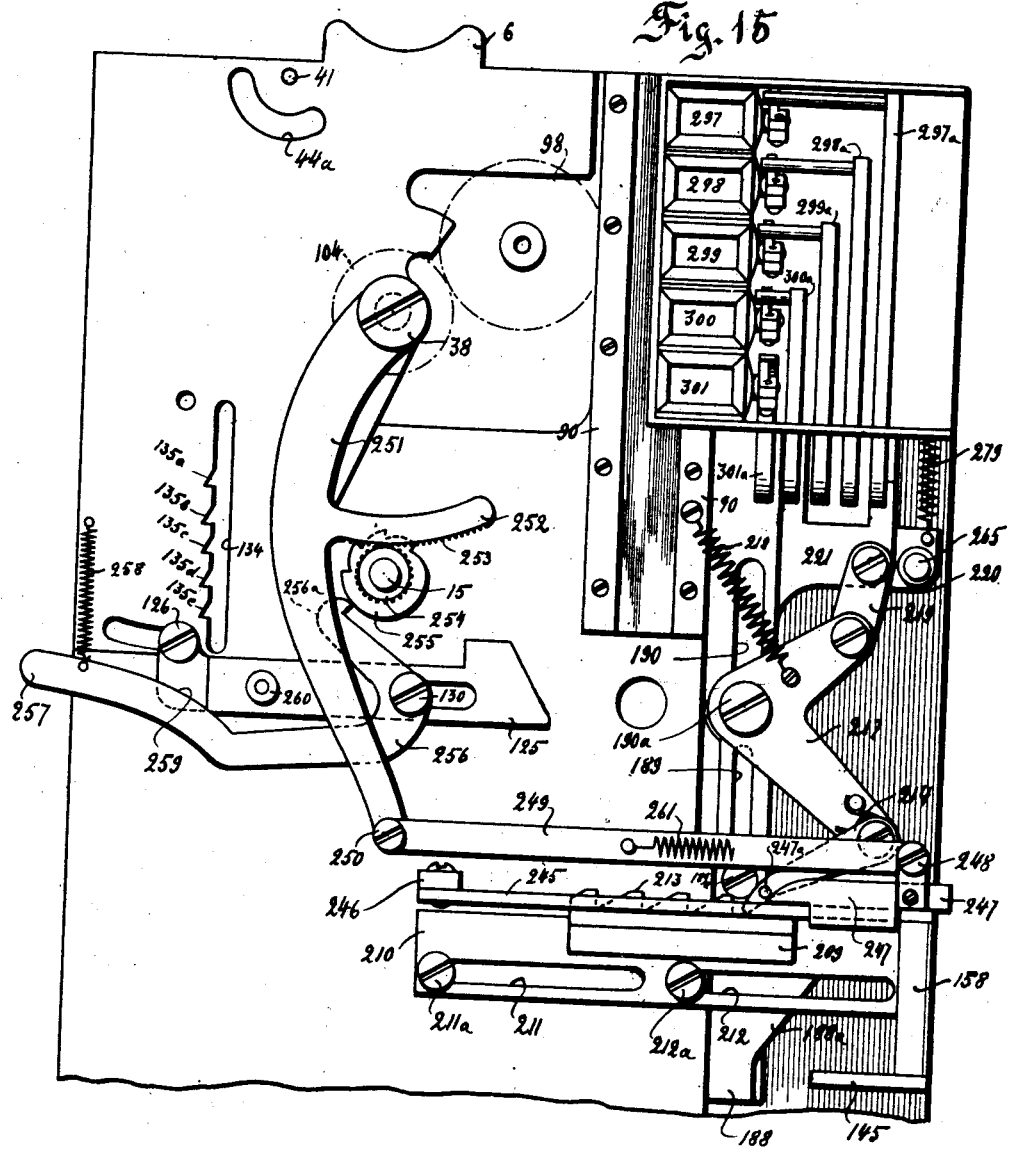
Fig. 15 is a rear diagrammatic elevation of the mechanism with the rear panel removed showing the multiple fare mechanism.
Figure 16:
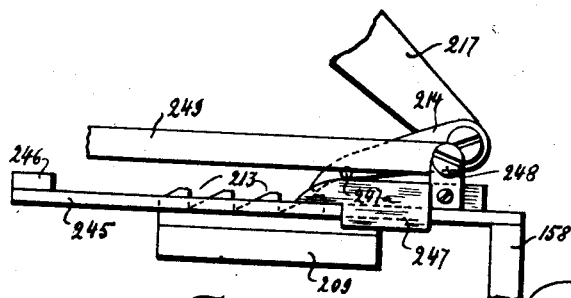
Fig. 16 is a detail of the multiple fare mechanism.

Referring now to Figs. 15 and 16 there is provided a bar 245 supported in spaced relation from the front panel 1 by means of a suitable bracket 246 secured at one end of the bar 245. The other end of the bar is preferably secured upon block 158 mounted upon sub-panel 145. A pawl lifting cam 247 is arranged for sliding movement on the bar 245 and provided with an upwardly extending projection 248 to which is pivotally connected one end of a connecting rod 249 having its other end pivoted at 250 to a curved lever arm 251 which in turn is pivoted on shaft 38. An extending arm in the form of sector 252 is secured to or formed on lever arm 251. Section 252 is provided with gear teeth 253 arranged to mesh with gear 254 rigidly secured to the fare selector shaft 15. The fare selector shaft likewise carries ratchet wheel 255 having a tooth for every fare over one desired to be collected by the machine. A detent arm 256 terminating in hook 256a is provided pivotally mounted on pin 130 and having an extension 257 projecting through the side wall of the machine beyond the edge of the front plate 1. A suitable spring 258 is provided for maintaining arm 256 at its clockwise extremity of movement and arm 256 is also formed to provide a cam surface 259 engageable by projecting pin or roller 260 mounted on push rod 125. A suitable spring 261 is provided having one end attached to connecting rod 249 and its other end attached to a fixed point not shown for the purpose of maintaining pawl lifter cam at its right hand extremity of travel and the associated parts in corresponding position.

*Operation of multiple fare mechanism*

In case it is desired to collect two fares from a quarter or a half-dollar deposited by the passenger, fare selector 14 will be rotated in a clockwise direction by the conductor until it arrives opposite the number 2 on fare selector indicator 13. This rotates fare selector shaft 15 in a counter clockwise direction, as viewed from Fig. 15, by an amount just sufficient to allow hook 256a to drop behind the first tooth on ratchet 255 thereby locking the fare selector at that position. Shaft 15 carries with it gear 254 which meshes with rack 253 and thereby rotates lever arm 251 clockwise causing the connecting rod 249 to move to the left and sliding pawl lifter cam 247 to the left against the tension of spring 261. A pin 247a is engaged by the pawl lifter cam and lifts the pawl 214 out of engagement with the first tooth of rack 213 (see Fig. 16). Pawl lifter cam 247 is moved such a distance to the left that when the machine is operated to collect the fare and return the change as previously described the pawl 214, instead of engaging the first tooth of rack 213, engages the second tooth thereof, and rack 213 and also rack 209 are moved only three-fourths of a full stroke which results in the turnstile 195 being rotated through three-fourths of a turn instead of a full turn and thereby removing only three nickels from the nickel magazine for delivery. Operation of the push rod 125 as previously described causes projection 260 to strike cam surface 259 and push the same downwardly thereby withdrawing hook 256a from ratchet 255 which permits spring 261 to return the cam 247 to its normal position and also carries back to normal position the swinging arm 251 and, by means of gear 254, fare shaft 15 and fare indicator 14 from which it will be seen that it is not necessary for the operator to remember to reset the machine to collect only one fare after it has been set to collect more than one since the operation of the machine itself automatically resets it to collect one fare. The operation to collect three or four fares from a quarter or a half-dollar is analogous to that already described the only difference being that to collect three fares, fare shaft 15 is rotated to such a point that hook 256a drops behind the second tooth of ratchet 255 and cam 247 is positioned to the left a sufficient distance so that pawl 214 is not permitted to drop until it has passed over one-half of the teeth of rack 213. Under these circumstances turnstile 195 makes only one-half of a complete revolution and therefore releases only two nickels into the change return cup.

In a corresponding manner if the fare selector is set to indicate and collect four fares, hook 256 is dropped behind the third tooth of ratchet 255, cam 247 is moved to the left a sufficient distance so that pawl 214 does not drop until it has passed over three teeth of rack 213 and turnstile 195 makes only one-quarter of a turn thereby delivering only one nickel. Finally if the machine is set to collect five fares hook 256a drops behind the last tooth of ratchet 255 and cam 247 is moved to the left so far that pawl 214 does not drop until it has passed completely over rack 213 and therefore turnstile 195 will not be operated at all.

The description given above is based on the assumption that the passenger had deposited either a quarter or a half-dollar. If the passenger deposits a dime the operation is slightly different. In case of a deposit of a quarter or a half-dollar the master change control finger 231 impinges on arm 221a and causes rotation of bell crank lever 217 through a complete stroke as previously explained. If however, the passenger deposits a dime the master change control finger 231 impinges upon arm 221b and as previously pointed out moves bell crank 217 though only one-quarter of its normal movement thereby rotating the turnstile 195 only through 90° and delivering only one nickel in return. If the fare selector is set to collect two fares when the passenger has deposited a dime it will be observed that the position of cam 247 prevents pawl 214 from dropping into engagement with rack 213 and therefore no change is returned, although three nickels would have been returned had the passenger deposited a quarter or a half-dollar instead of a dime.

It will be clear that if it is desired to provide a machine which will make change without subtracting the amount to be collected, it is only necessary to provide ends 221a and 221b longer on plate 221 whereby the turnstile 195 will be rotated 5/4 of a complete turn when a quarter is deposited and 2/4 or 1/2 when a dime is deposited. Plate 188 will remain as shown in making complete change for a half-dollar. It will be understood that if only a change making machine is desired, the multiple fare and counting mechanism may be omitted as unnecessary.

Counting mechanism

Figure 17:
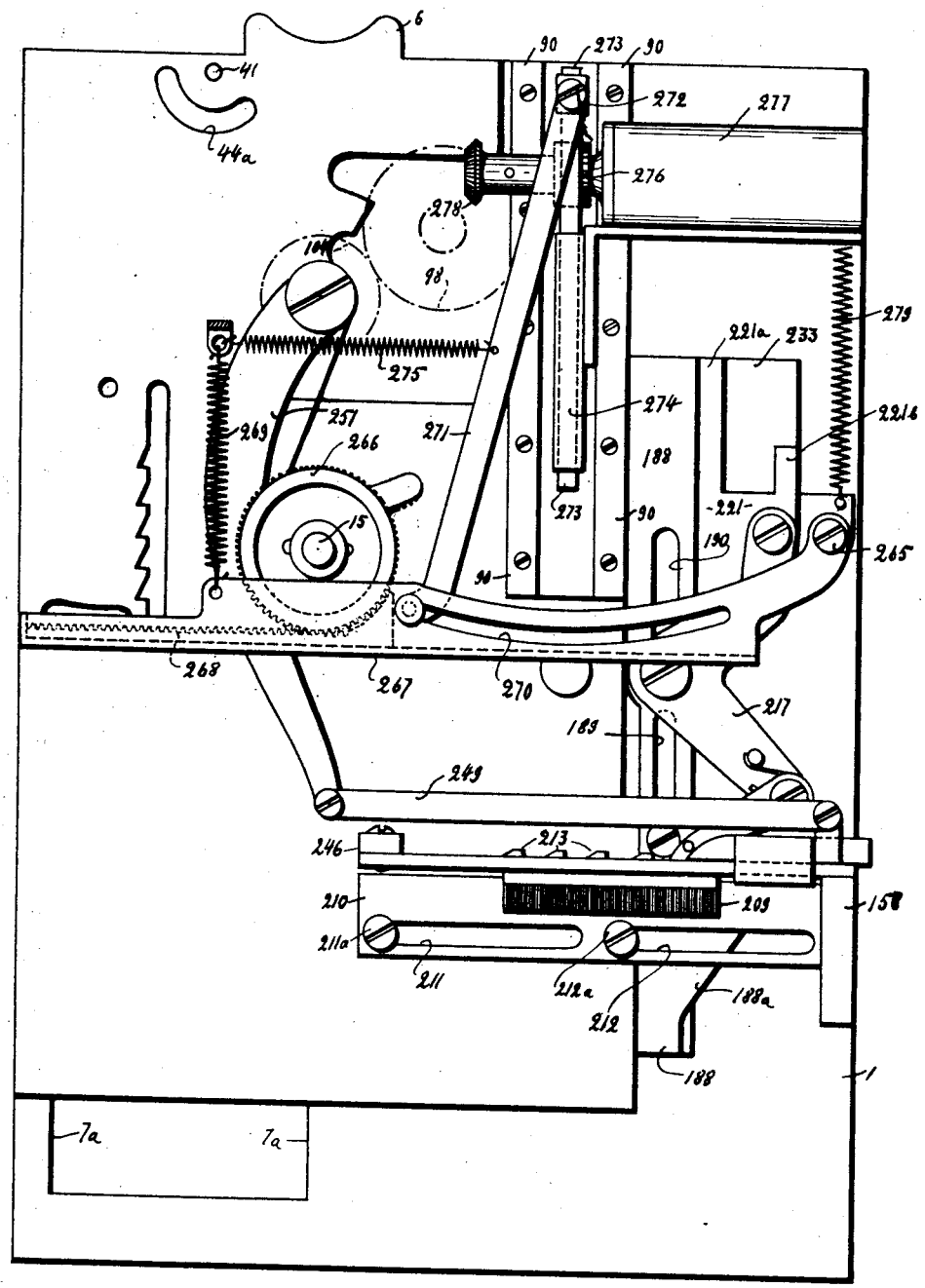
Fig. 17 is a rear diagrammatic elevation showing the master collection counter and associated mechanism.

It has already been pointed out that downward operation of the master change control finger 231 carries downward plate 233 which it was stated actuated certain counting mechanism. This counting mechanism will now be described. Plate 233 is provided with a relatively long projection 265, and fare selector shaft 15 carries a gear 266 rigidly secured thereto. (Figs. 11 and 17). A lever 267 channeled or U shaped in cross section is pivoted at one end to projection 265 and carries a rack 268 slidable within the arm 267 and meshing with gear 266. A suitable spring 269 is attached to lever 267 at a point beyond gear 266 in such manner as to maintain rack 268 continuously pressed against gear 266. Lever 267 is also provided with an arcuate slot 270 in which is slidably mounted one end of a connecting rod 271 which rod is engaged by the right hand extremity of sliding rack 268. The upper end of rod 271 is pivotally connected at 272 to a rack 273 mounted for sliding motion within a suitable sleeve 274. A suitable spring 275 is provided for maintaining the connecting rod 271 at its clockwise extremity of movement. A suitable gear 276 meshing with rack 273 is provided on the shaft of a master counter 277 provided with lost motion such that clockwise rotation of gear 276 actuates the counting mechanism, and counter clockwise rotation of the gear has no effect. The structure by which this takes place is a part of the counting mechanism which is per se no part of my invention but may be purchased in the open market and is therefore not further described. The master counter shaft carries a suitable bevel gear 278 for engagement with another gear 310 (see Fig. 19) for operating a trip counter or trip register which will be described later. In addition a suitable spring 279 is provided for maintaining plate 233 at its upward extremity of movement.

Operation of counting mechanism

If the fare selector is set to collect one fare the rack 268 carried on lever 267 occupies the position shown in Fig. 17. Upon the operation of the machine as previously described, master change control finger 231 moves to the right and downward impinging upon plate 233 and moving it downward thereby carrying projection 265 downward and moving the right hand end of lever 267 downward. Since spring 269 maintains rack 268 in engagement with gear 266 the latter operates as a floating pivot for lever 267 which rotates clockwise upon gear 266 thereby carrying connecting rod 271 downward and through connection 272 carries rack 273 downward rotating gear 276 clockwise and thereby actuating the counter. The length of stroke of the connecting rod 271 and the amount of rotation of gear 276 in this instance will be so chosen as to cause the counter 277 to record one fare. Upward movement of master control finger 231 allows plate 233 to slide upward under the influence of the spring 279 carrying projection 265 returning rack 267 to its initial position thereby rotating gear 276 in a counter-clockwise direction which as previously stated does not affect the master counter.

If now the fare selector is set to collect two fares gear 266 carried on fare selector shaft 15 will be rotated counter-clockwise, as viewed from Fig. 17, thereby sliding rack 268 to the right within lever 267 and swinging connecting rod 271 about pivot 272 in a counter-clockwise direction. It will now be seen that the distance from the lower end of connecting rod 271 to the floating pivot formed by gear 266 and rack 268 is greater than before and consequently downward movement of plate 233 under the action of master change control finger 231 will cause connecting rod 271 to be moved downward a greater distance than before, thereby causing greater rotation of gear 276. In this instance the movement given gear 276 is sufficient to register two fares upon the master counter 277. The release of the fare control shaft 15 as previously described permits the gear 266 to be returned to its initial position thereby returning rack 268 to its initial position and permitting spring 275 to return connecting rod 271 to its initial position.

The operation of the counting mechanism to record three, four and five fares is similar to that already described for the recording of two fares, the difference being that for three, four and five fares selector shaft 15 is rotated a greater amount thereby rotating gear 266 a correspondingly greater amount and sliding rack 268 a greater distance to the right which moves the lower end of connecting rod 271 a progressively greater distance from the floating pivot of lever arm 267 thereby progressively increasing the downward movement of rack 273 and the rotation of master counter gear 276.

Rejection mechanism

Referring now to Fig. 10 rejector sleeve 17 is provided with a disc 285 rigidly secured thereto and also with a cam 286 connected behind disc 285. Crank arm 287 is secured to disc 285 and shaft 38 is provided with a sector 288 rotatably mounted thereon. Crank arm 287 is connected to sector 288 by means of a link 289 and disc 285 is provided with a notch 290 adapted to be engaged by pawl 291 pivoted on pin 130 and provided with an angularly extending arm 292. Pawl 291 is maintained in engagement with disc 285 by any suitable means, such as a spring, not shown. A lever arm 293 is pivotally mounted at 295 on connecting rod 232 and has its right hand end terminating in a cylindrical portion 293a adapted to be received in hole 294 in master change control finger 231 and having its other end 293b formed into a head adapted to engage sector 288. At this point it should be noted that sector 288 is preferably formed as a warped surface cam as best seen in Fig. 11, in such manner that counter clockwise rotation of the sector as seen in Fig. 10 engages the end 293b of lever 293 and swings it about its pivot 295 against the action of return spring 296.

Referring now to Fig. 15 there are provided rejection counters for each coin which will be passed into the machine. In this example there is provided a dime counter 297, a penny counter 298, a nickel counter 299, a quarter counter 300 and a half-dollar counter 301. A suitable operating rod and associated mechanism is provided for each counter as will be seen from Figs. 11 and 15. This mechanism may comprise L-shaped arms 297a, 298a, 299a, 300a and 301a respectively for operating the counters individually, to record the number of rejections of each particular size of coin. Return springs are provided, not shown, for returning each of the rejection counters and its associated mechanisms to its initial position.

Referring again to Fig. 10 there is provided a lever 302 pivoted at its upper end at 303 and connected at its lower end at pivot 304 with connecting rod 305 which in turn is connected to shaft 75 controlling the rejector gate 74. This lever 302 is maintained against cam 286 by a suitable spring and thereby the gate 74 is maintained normally in position to collect coins deposited.

Operation of rejection mechanism

If the collector observes that the coin deposited by the passenger is a counterfeit or slug he will then operate rejector handle 16 rotating it clockwise as seen in Fig. 1, thus rotating sleeve 17, disc 285 and cam 286 counter-clockwise as viewed from Fig. 10. The operation of cam 286 rotates lever 302 counter-clockwise immediately and maintains it at the full extent of such movement while cam 286 is being further rotated, by reason of the particular shape of the cam. The lever 302 operates connecting rod 305 rotating shaft 75 and thereby rotating rejector gate 74 clockwise as seen in Fig. 2 in preparation for the release of the coin from the classifier which occurs when the machine is cleared. As soon as notch 290 passes pawl 291 the latter engages the notch 290 thereby locking the mechanism in position to reject. Counter-clockwise rotation of arm 287 rotates sector 288, through connecting rod 289, and the warped surface of cam 288 operating on the head 293b of lever 293, as will be seen from Fig. 12, rotates lever 293 clockwise about its pivot thereby moving master change control finger 231 to the left or outwardly in the opening 230 and holding it at its left hand or outward extremity of movement. It will be observed that this shift in the position of master change control finger 231 accomplishes two results: (1) it moves the finger to such a position that in its downward movement it does not come into contact with any of the plates 188, 221 or 233 and therefore actuates no change delivery mechanism or collection counting mechanism and (2) (see Figs. 11 and 12) it puts the rear end of the master change control finger in position where it will engage the outwardly extending portion of one of the levers 297a, 298a, 299a, 300a, or 301a to actuate one of the rejection counters. It will be noted that the master change control finger 231 will be positioned along the slide 226 depending upon the size of the slug deposited just the same as if a good coin were deposited.

All of the above, it is to be noted, takes place on operation of the rejector handle 16 and the operation of pawl 291 locks the machine in position to reject so that now it is impossible to do anything but reject the coin in the classifier jaws. Rotation of the main shaft 20 by the main operating handle to clear the machine now causes the machine to reject the coin as follows: cam 127 strikes push rod 125 thereby swinging the movable jaw 10 releasing the coin which drops through rejector passage 70 into the change return cup. Shortly afterward, cam 127 actuates the lever 292 withdrawing pawl 291 from notch 290 and permitting disc 285 to be returned to its initial position by a suitable return spring operating on any desired part of the mechanism. The return of disc 285 takes place simultaneously with the return of arm 287, connecting rod 289 and sector 288 which releases arm 293b of lever arm 293 which is returned to initial position thereby restoring master change control finger 231 to its normal position.

Trip register mechanism

It will be remembered that in describing the counting mechanism reference was made to bevel gear 278 (Fig. 17) which, it was stated, actuated certain trip register mechanism. This trip register mechanism will now be described.

Bevel gear 310 (Fig. 19) previously referred to, is arranged to mesh with gear 278 and is carried on a sleeve 311 freely rotatable on shaft 312. A ratchet wheel 313 is rigidly mounted on sleeve 311. A gear 315 is fixed to and mounted for rotation on shaft 312 and having two teeth only. A gear 314 is also provided having ten times as many teeth as gear 315. In this instance the number of teeth on gear 314 will therefore be twenty. Also a relatively wide gear 316 is provided engaging the teeth of gears 314 and 315 and carried on a suitable bracket 316a and shaft 316b. A pawl 317, fixed on gear 315, is adapted to engage ratchet wheel 313. A suitable star wheel 318 is secured to the side of gear 315 facing gear 314. A similar star wheel 319 is secured on gear 314 adjacent star wheel 318 and centering pawls 320 and 321 are provided adapted to be forced under the action of suitable springs against the respective star wheels. Star wheel 319 is provided with a circular track or depression 322 to accommodate pawl 323 pivotally mounted on gear 314 and a suitable bushing 324 secured to gear 315. A notch 325 is provided in the bushing 324 adapted to be engaged by the pawl 323. A bevel gear 326 is provided on shaft 316b rigidly secured thereto, and bevel gear 327 adapted to mesh with the gear 326 is provided on slidable shaft 328 and rigidly secured thereto. Shaft 328 is urged to the right by means of spring 329 so as to maintain bevelled gear 327 out of engagement with bevel gear 326 and is provided at its outer end with an operating knob 330 by means of which the trip counter may be set to zero.

In addition a bell 331 is provided adapted to be rung by a hammer 332 through the action of ratchet wheel 333 and lever 333a pivoted at 333b. Finally there is provided a pair of discs 334 and 335, the rear one 334 of which may be left solid and the front one 335 of which has sections removed therefrom to show the rear disc 334. Suitable fare indicating numbers are marked upon these discs. Rear disc 334 is fixed on the shaft 312 to which the gear 315 is also fixed, and the cut out disc 335 is rigidly connected to gear 314 by means of a suitable sleeve 336.

It will be noted that only alternate segments of the rear disc 334 are visible through the front disc 335 and the numerals zero to nine inclusive are provided increasing in clockwise direction such that counter-clockwise rotation of the disc 334 by a distance equal to twice the width of the cut-out portion in disc 335 causes the digit shown at any point on disc 334 to increase by one. A corresponding series of numerals is provided on the extending portions of disc 335 and only the top center digits of each disc are visible through the windows of the machine from which it will be seen that the rear disc 334 is the units disc and indicates the units digit, whereas disc 335 is the tens disc and indicates the tens digit.

Operation of the trip counter

Assuming that the disc indicates zero and that gear 278 is rotated in accordance with the collection of one fare, bevel gear 310 will be rotated counter-clockwise and since pawl 317 is engaged with ratchet 313 and ratchet 313 is rotated by the rotation of gear 310, gear 315 will be rotated counter-clockwise through a distance corresponding to one fare and this rotation will be transmitted through shaft 312 and rear disc 334 will be moved counter-clockwise so that the register will show one fare. Rotation of gear 278 in the opposite direction has no effect as ratchet 313 is free to rotate in a clockwise direction under pawl 317. At the same time that disc 334 is rotated to indicate one fare ratchet 333 operates lever 333a and hammer 332, ringing bell 331 once. In a similar way rotation of gear 278 by an amount sufficient to record two, three, four or five fares produces a similar result in the trip counting mechanism except that the proper number of fares is indicated since rotation of gear 310 is proportional to rotation of gear 278. After gear 315 has been rotated counter-clockwise to such a position that the digit nine appears on the disc 334 the two teeth of gear 315 will have come into position to engage gear 316 and the next rotation of gear 310 will cause rotation of discs 334 and 335 at the same time thereby causing "1" to appear on the tens disc and "0" to appear on the units disc. After this no further movement of the tens disc will take place until nineteen fares is shown on the register at which time the teeth on gear 315 will have made another complete revolution and tens disc 335 will again be rotated. (The gear mechanism by which this particular effect is produced is well known in the art and is per se no part of my invention). It will be readily understood that the trip register may indicate anything up to ninety-nine fares at which point registration of another fare will cause the mechanism to show zero.

In order to reset the mechanism at the end of a trip to bring it back to zero, the shaft 328 will be pushed in and rotated by means of the knob 330. It will be found possible to rotate this knob only in a clockwise direction which will produce clockwise rotation of gear 316 through gears 327 and 326 thereby producing counter-clockwise rotation of gear 314 and the tens disc 335.

If the zeros on discs 334 and 335 occupy the relative position shown in Figs. 18 and 20 with the zero on the tens disc 335 on the left and adjacent to zero on the units disc 334 then pawl 323 will be resting in notch 325 and counter-clockwise rotation of gear 314 acting through pawl 323 and notch 325 will carry gear 315 and thereby units disc 334 along with it in a counter-clockwise direction and discs 334 and 335 will be simultaneously rotated counterclockwise, but maintain during rotation in the same relative position shown in Fig. 18. Rotation of the knob 330 will be continued until the register shows zero at which point it is ready to start a new trip. If the two zeros are not in the position described above then rotation of gear 314 carrying with it tens disc 335 will take place without rotation of units disc 334 until pawl 323 engages notch 325 at which time the operation will be similar to that already described. It will thus be seen that not more than one complete rotation of the units disc and not more than two complete rotations of the tens disc are necessary to reset the register to zero from any position.

In connection with the foregoing description reference is hereby made to my copending application, Serial No. 354,491, filed April 12, 1929, wherein I have claimed certain features of my invention shown and described herein; in other words, the patentable subject matter common to this application and my said copending application is claimed in the latter.

What I claim is:—

1. In apparatus of the class described, a plurality of sliders arranged to control coin delivery, a finger mounted for reciprocating movement for normally operating said sliders, a connecting rod having one end secured to said finger for shifting said finger laterally to a position in accordance with the denomination of coin to be cleared, and means for shifting said finger longitudinally out of slider engaging position to reject a coin, said means comprising a relatively long lever pivotally mounted on said connecting rod for movement about an axis displaced from vertical and a cam arranged to engage said lever to maintain said finger out of position to engage said sliders during clearing.

2. In apparatus of the class described, a plurality of sliders arranged to control coin delivery, a finger mounted for reciprocating movement for normally operating said sliders, a connecting rod having one end secured to said finger for shifting said finger laterally to a position in accordance with the denomination of coin to be cleared, and means for shifting said finger longitudinally out of slider engaging position to reject a coin, said means comprising a relatively long lever pivotally mounted on said connecting rod for movement about an axis displaced from vertical and a cam arranged to engage said lever to maintain said finger out of position to engage said sliders during clearing, said cam comprising a sector mounted for rotation and having a surface of sufficient width to maintain said finger out of contact with said sliders during clearing.

3. In apparatus of the class described, a plurality of sliders arranged to control coin delivery, a finger mounted for reciprocating movement for normally operating said sliders, a connecting rod having one end secured to said finger for shifting said finger laterally to a position in accordance with the denomination of coin to be cleared, and means for shifting said finger longitudinally out of slider engaging position to reject a coin, said means comprising a relatively long lever pivotally mounted on said connecting rod for movement about an axis displaced from vertical and a cam arranged to engage said lever to maintain said finger out of position to engage said sliders during clearing, said cam comprising a sector mounted for rotation about an axis normal to the plane of movement of said connecting rod and having a surface sufficiently wide to maintain said finger out of contact with said sliders during clearing.

4. A change making machine comprising, means for receiving deposited coins of different denominations, mechanism for collecting one or a plurality of fares from a deposited coin by returning various amounts of change therefor, and a register adapted to record the maximum number of fares which the machine may collect in a single operation, in combination with controlling means operated by said collecting mechanism for actuating said register in accordance with the number of fares collected, said controlling means comprising a collector index, a gear, a substantially U-shaped lever arm, a rack slidably mounted in said lever arm and meshing with said gear, a connecting rod adapted to have one end thereof operatively positioned along said lever at various points with respect to the fulcrum thereof and means actuated by said collector index for varying at will the position of said connecting rod with respect to said fulcrum.

5. In an apparatus of the class described, a plurality of sliders arranged to control the delivery of change for deposited coins, means for rejecting said coins, a plurality of counters corresponding respectively to coins of different denominations and adapted to record the coins rejected, a finger mounted for lateral movement and normally adapted to operate said sliders and also adapted to be longitudinally adjusted to actuate one of said counters, and means for shifting said finger laterally to a position corresponding to the denomination of a coin deposited, comprising in combination, cam actuated means for adjusting said finger longitudinally from slider engaging position to counter engaging position, and means for operating said rejecting means and said finger whereby to actuate one of said counters to record the rejection of coins.

6. A change making machine comprising, means for receiving deposited coins of different denominations, means for storing said coins in magazines corresponding respectively to the denominations of the coins deposited, said storing means comprising means for introducing the coins into said magazines through the bottom thereof in combination with, change return mechanism comprising a turn-stile ejector adapted to eject change from one of said magazines and means for successively actuating said storing means and said change return mechanism.

7. A change making machine comprising, means for receiving deposited coins of different denominations, means for storing said coins in magazines corresponding respectively to the denominations of the coins deposited, said storing means comprising means for introducing the coins into said magazines through the bottom thereof in combination with, change return mechanism comprising a rotatable turn-stile ejector and a reciprocating slide ejector adapted to eject change from said magazines and means for successively actuating said storing means and said change return mechanism to eject various amounts of change for the coins deposited.

8. A change making machine comprising, means for receiving deposited coins of different denominations, means for storing said coins in magazines which correspond respectively to the denominations of coins deposited, said storing means comprising means for introducing the coins into said magazines through openings in the bottom thereof in combination with, change return mechanism in cooperative relationship with the bottoms of said magazines and comprising a turn-stile ejector adapted to eject various amounts of change from one of said magazines, means for successively actuating said storing means and said change return mechanism and means for varying the angular movement of said turn-stile in accordance with the amount of change to be returned.

9. A change making machine comprising, means for receiving deposited coins of different denominations, means for storing certain of said coins in a magazine, said storing means comprising means for introducing coins into said magazine through an opening in the bottom thereof in combination with, change return mechanism in cooperative relationship with the bottom of said magazine and comprising a rotatable turn-stile ejector adapted to eject change from said magazine, means for successively actuating said storing means and said change return mechanism and means for varying the degree of rotation of said turn-stile in accordance with the amount of change to be returned.

In testimony whereof, I have hereunto affixed my signature this 29th day of July, 1926.

CHARLES E. CHALMERS.